United States Patent
Varlakov et al.

(10) Patent No.: US 9,807,629 B1
(45) Date of Patent: Oct. 31, 2017

(54) PERFORMING AN ANALYSIS OF INFORMATION TO IDENTIFY A SOURCE OF AN ERROR RELATED TO A DEVICE

(71) Applicant: Verizon Patent and Licensing Inc., Arlington, VA (US)

(72) Inventors: Jivko Varlakov, Homosassa, FL (US); Brian E. Bond, Fairmont, WV (US); Fijula Kuniyil, Irving, TX (US); Nityanand Sharma, Tampa, FL (US); Jagannath K. Rangarajan, Irving, TX (US); Girish Nair, Lutz, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/403,901

(22) Filed: Jan. 11, 2017

(51) Int. Cl.
*H04B 17/00* (2015.01)
*H04W 24/00* (2009.01)
*H04W 24/04* (2009.01)
*H04W 4/02* (2009.01)
*H04B 17/318* (2015.01)

(52) U.S. Cl.
CPC .......... *H04W 24/04* (2013.01); *H04B 17/318* (2015.01); *H04W 4/022* (2013.01)

(58) Field of Classification Search
CPC ..... H04W 24/00; H04W 24/06; H04W 24/08; H04W 64/00; H04W 84/12; H04M 1/24; H04M 2207/18
USPC ................. 455/67.11, 67.14, 423, 424, 425
See application file for complete search history.

(56) References Cited

U.S. PATENT DOCUMENTS

| | | | | |
|---|---|---|---|---|
| 7,499,700 | B2 * | 3/2009 | Dillon | H04W 24/00 455/423 |
| 8,526,938 | B1 * | 9/2013 | Gardner | H04W 24/00 455/423 |
| 8,700,028 | B2 * | 4/2014 | Harris | H04L 41/0681 455/425 |
| 9,692,584 | B2 * | 6/2017 | Siomina | H04L 5/16 |
| 2007/0124047 | A1 * | 5/2007 | Roelleke | B60R 21/013 701/45 |

OTHER PUBLICATIONS

GooglePlay, "Wifi Analyzer," https://play.google.com/store/apps/details?id=com.farproc.wifi.analyzer&hl=en, Jan. 1, 2017, 3 pages.

* cited by examiner

*Primary Examiner* — Quochien B Vuong

(57) ABSTRACT

A tester device may establish a connection to customer devices using protocols, such as a Universal Plug and Play (UPnP) protocol or an Open Mobile Alliance device management (OMA DM) protocol. The tester device may receive information related to wireless communications or operations of the customer devices and the information may be determined by the customer devices. The tester device may perform an analysis of the information. The tester device may provide instructions to the customer devices to cause the customer devices to use a channel to communicate. The tester device may perform a throughput test of the customer devices. The tester device may receive additional information based on performing the throughput test. The tester device may perform a comparison of the information and the additional information. The tester device may provide other instructions to the customer devices to cause the customer devices to use the channel.

20 Claims, 15 Drawing Sheets

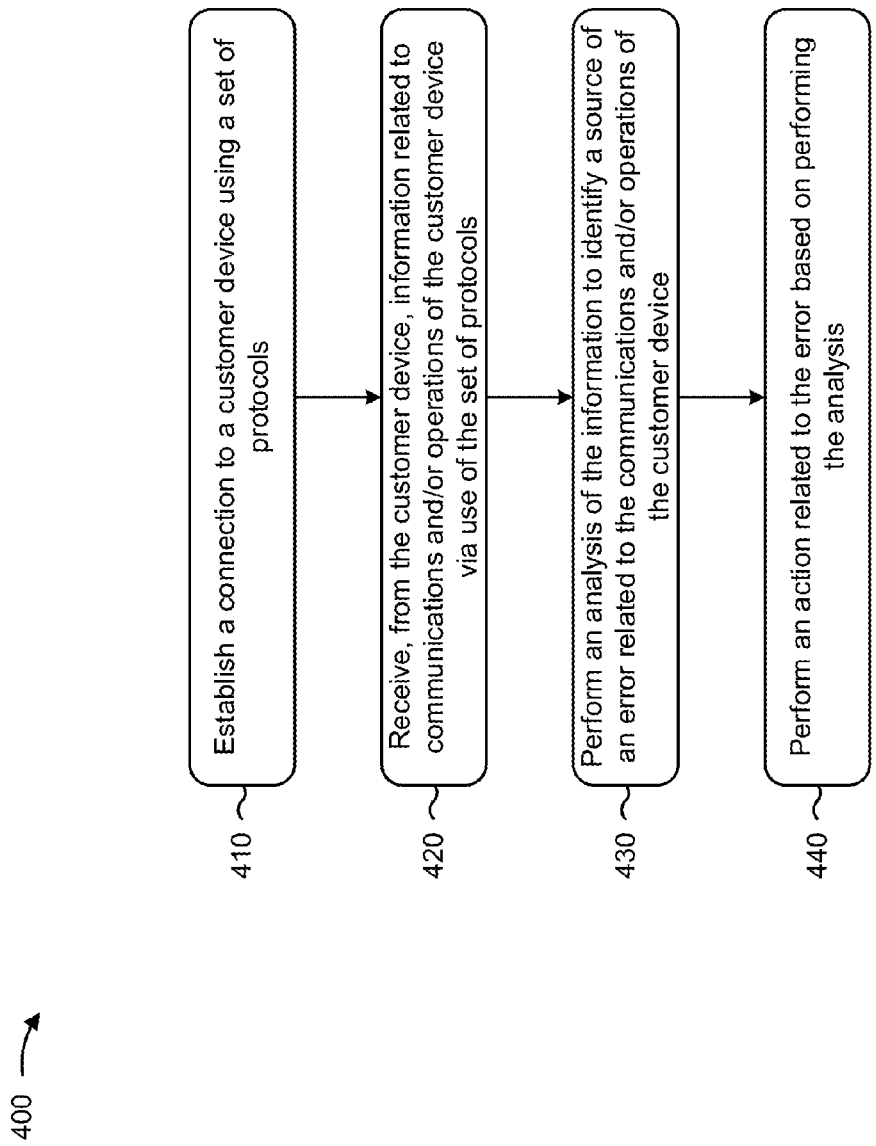

PERFORMING AN ANALYSIS OF INFORMATION TO IDENTIFY A SOURCE OF AN ERROR RELATED TO A DEVICE

BACKGROUND

Universal Plug and Play (UPnP) is a set of networking protocols that permits networked devices, such as personal computers, printers, Internet gateways, Wi-Fi access points, and/or mobile devices to seamlessly discover the presence of other network devices and establish functional network services for data sharing, communications, and/or entertainment. UPnP is often used for residential networks.

Open Mobile Alliance (OMA) Device Management (DM) (OMA DM) is a device management protocol designed for management of mobile devices, such as mobile phones, personal digital assistants (PDAs), and tablet computers. Such device management may support fault management, software upgrades, and/or the like.

BRIEF DESCRIPTION OF THE DRAWINGS

FIG. 4 is a flow chart of an example process for performing an analysis of information to identify a source of an error related to a device;

DETAILED DESCRIPTION OF PREFERRED EMBODIMENTS

The following detailed description of example implementations refers to the accompanying drawings. The same reference numbers in different drawings may identify the same or similar elements.

A device (e.g., a customer device) may experience a communication and/or operation error (e.g., due to signal interference, out-of-date software, etc.). A technician may use an external device, such as a Wi-Fi analyzer, a signal meter, or a device that performs diagnostic functions, to determine a source of the error. Such an external device, however, may function in a different manner than the customer device and/or use different technology. This may reduce an accuracy of identifying the source of the error. In addition, different external devices may be needed to test different operations of the device, different types of communications, and/or the like.

Implementations described herein provide a tester device, which receives information related to communications and/or operations of a customer device, directly from the customer device (e.g., as measured or determined by the customer device). The tester device may perform an analysis of the information to identify a source of an error related to the communications and/or operations of the device. The tester device may further perform an action related to a result of the analysis. In this way, the tester device increases an accuracy of identifying a source of an error by using information as measured or determined by the customer device, rather than using the tester device to measure or determine the same information. Furthermore, the tester device increases an efficiency and reduces an amount of time to identify a source of an error. Further still, the tester device reduces or eliminates the need for multiple external devices to identify a source of an error, thereby conserving resources.

Figure 1A:
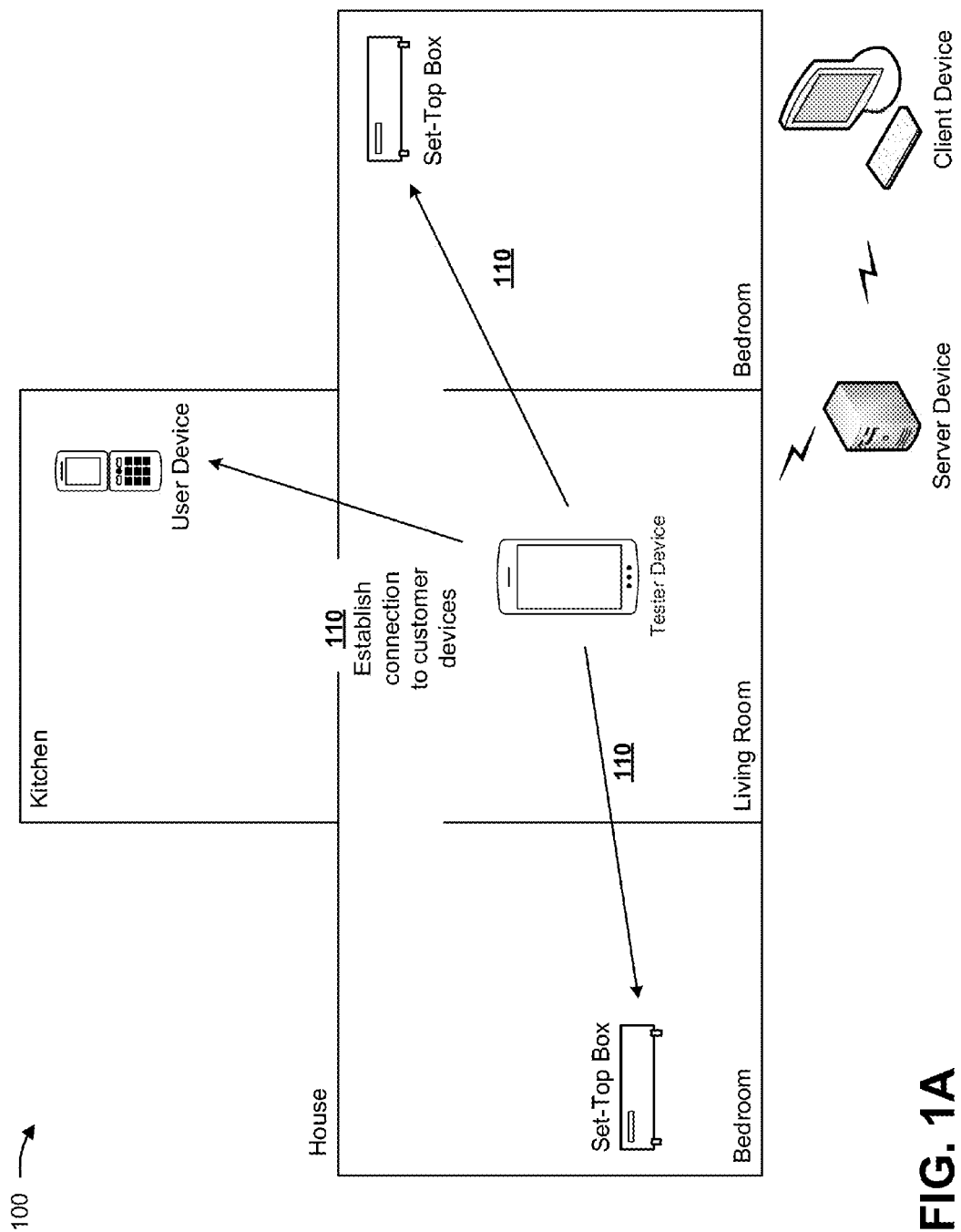
FIGS. 1A and 1B are diagrams of an overview of an example implementation described herein.
Figure 1B:
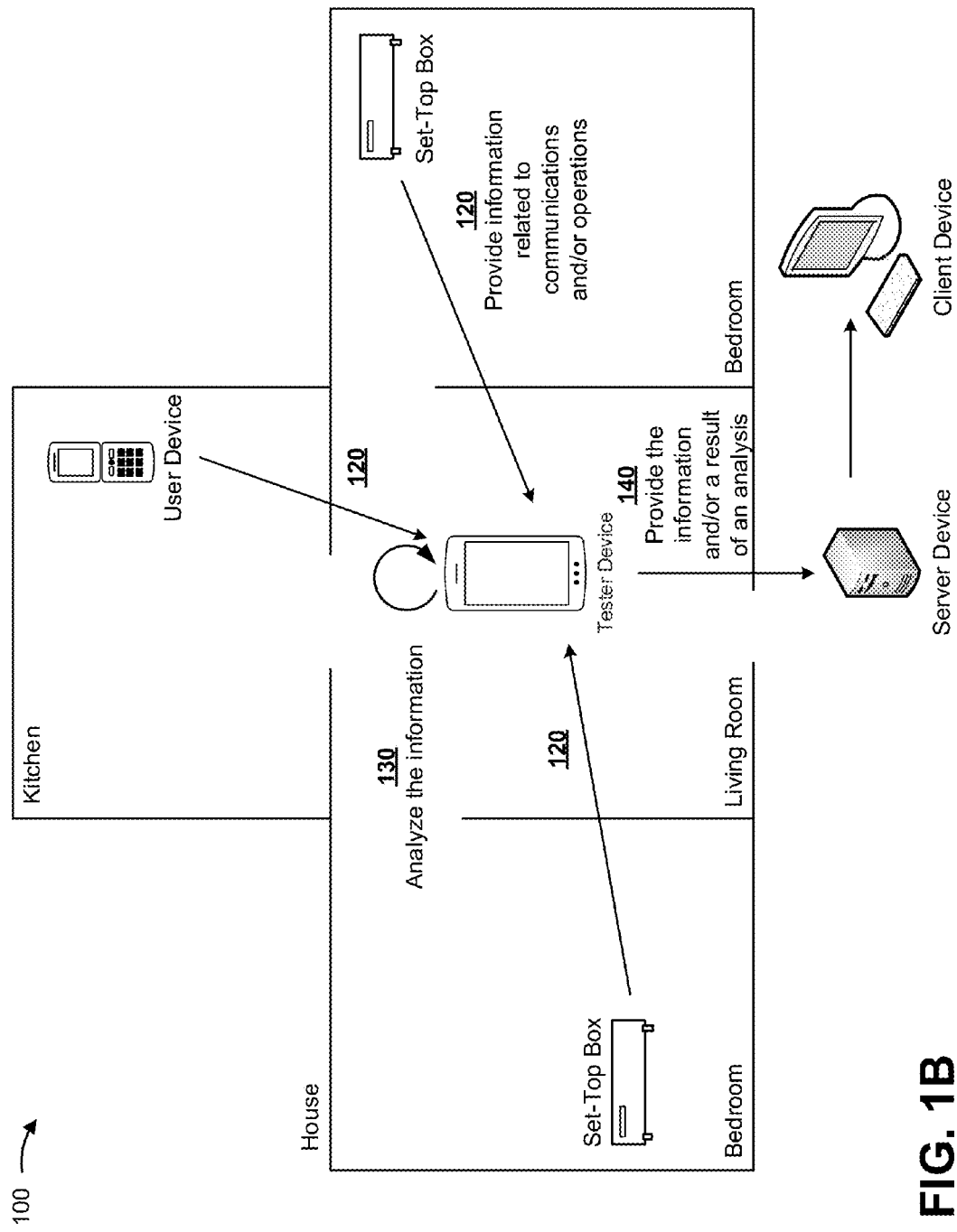

FIGS. 1A and 1B are diagrams of an overview of an example implementation 100 described herein. As shown in FIG. 1A, example implementation 100 may include one or more customer devices, such as a user device or one or more set-top boxes, a server device, a client device, and a tester device. As shown by reference number 110, the tester device may establish a connection (e.g., a wireless connection) to the customer devices (e.g., the user device and the set-top boxes). In some implementations, the tester device may establish the connection to the customer devices via a local area network (LAN), thereby reducing or eliminating the need for the tester device to have wide area network (WAN) connectivity. In addition, this may reduce an amount of time for communications between the tester device and the customer devices, thereby increasing an efficiency of determining a source of an error related to the customer devices.

As shown in FIG. 1B, and by reference number 120, the tester device may receive, from the customer devices, information related to communications and/or operations of the customer devices. For example, the tester device may receive a signal-to-noise ratio (SNR) value as measured by the customer devices, information identifying which channels the customer devices are using to communicate, and/or the like, from the customer devices. The tester device may receive the information from the customer devices via use of one or more protocols. For example, the tester device may receive the information from the customer devices via use of Universal Plug and Play (UPnP) protocols, Open Mobile Alliance (OMA) device management (OMA DM) protocols, and/or another set of protocols that permits device-to-device communications and/or direct communications.

As shown by reference number 130, the tester device may analyze the received information, such as to identify a source of an error related to communications and/or operations of the customer devices. For example, the tester device may perform one or more tests on the customer devices, may compare information from different customer devices, and/or the like.

As shown by reference number 140, the tester device may provide the information and/or a result of the analysis. For example, the tester device may provide information identifying the source of an error to another device (e.g., a server device or a client device) for display, for remote support purposes, to store a record of providing support services to the customer devices (e.g., for future use), and/or the like.

In addition, the tester device may generate a recommendation related to the customer devices. For example, the tester device may generate a recommendation related to fixing the error based on identifying the source of the error. Further, the tester device may provide a set of instructions to the customer devices to fix the error, thereby improving communications and/or operations of the customer devices.

In this way, the tester device increases an accuracy of identifying a source of an error of a customer device by using information directly from the customer device (e.g., as measured or determined by the customer device, rather than the tester device measuring or determining the information). Furthermore, the tester device increases an efficiency and reduces an amount of time to identify a source of an error of the customer device, thereby conserving processing resources. Further still, the tester device reduces or eliminates the need for multiple external devices to identify a source of an error, such as multiple signal meters or diagnostic devices, thereby conserving processing resources and increasing an efficiency of identifying a source of an error related to communications and/or operations of a customer device.

As indicated above, FIGS. 1A and 1B are provided merely as an example. Other examples are possible and may differ from what was described with regard to FIGS. 1A and 1B.

Figure 2:
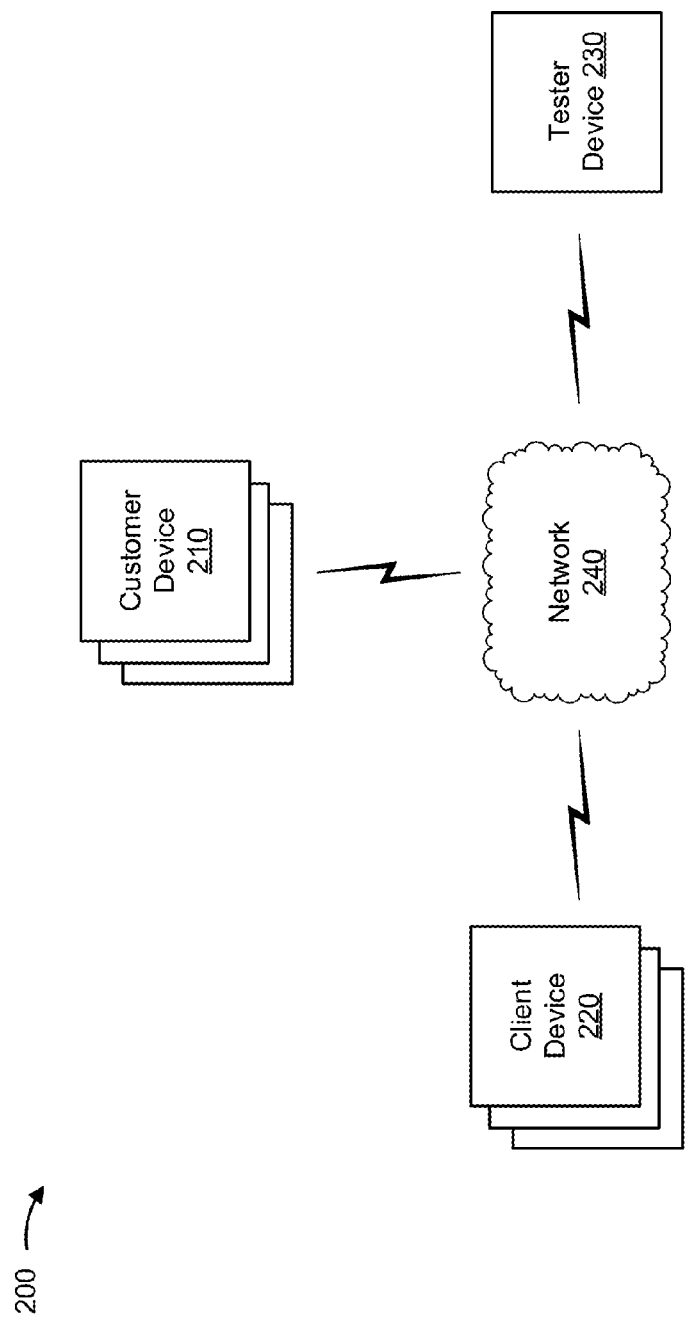
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more customer devices 210 (referred to collectively as "customer devices 210" and individually as "customer device 210"), one or more client devices 220 (referred to collectively as "client devices 220" and individually as "client device 220"), a tester device 230, and a network 240. Devices of environment 200 may interconnect via wired connections, wireless connections, or a combination of wired and wireless connections.

Customer device 210 includes one or more devices capable of receiving, generating, storing, processing, and/or providing information associated with communications and/or operations of customer device 210. For example, customer device 210 may include a set-top box, a telephone (e.g., an Internet protocol (IP) telephone), video conferencing equipment (e.g., a webcam or a display screen), a fax machine, a digital video recorder (DVR), a server, a client device, as described below, or a similar type of device. As another example, customer device 210 may include a mobile phone (e.g., a smart phone or a radiotelephone), a laptop computer, a tablet computer, a gaming device, a wearable communication device (e.g., a smart wristwatch, a pair of smart eyeglasses, or an activity band), or a similar type of device.

As another example, customer device 210 may include a network device, such as a router, wireless local area network gateway device, an access point, a broadband home router, a gateway, a switch, a hub, a bridge, a reverse proxy, a server (e.g., a proxy server, a web server, a host server, a storage server, a server in a data center or cloud computing environment, etc.), a firewall, a security device, an intrusion detection device, a load balancer, or a similar type of device. As another example, customer device 210 may include a machine-to-machine device (e.g., a smart device or an Internet of Things (IoT) device), such as a thermostat, a light bulb, a garage door opener, a light switch, a medical device, a vehicle, and/or a similar type of device. In other words, customer device 210 may include any device capable of communicating with tester device 230 (e.g., using OMA DM protocols and/or UPnP protocols).

In some implementations, customer device 210 may provide information related to communications and/or operations of customer device 210 to tester device 230, as described elsewhere herein. Additionally, or alternatively, customer device 210 may receive instructions to configure in a particular manner or to perform a particular action (e.g., for testing of customer device 210) from tester device 230, as described elsewhere herein.

Client device 220 includes one or more devices capable of receiving, generating, storing, processing, and/or providing information associated with communications and/or operations of a device (e.g., customer device 210). For example, client device 220 may include a communication and computing device (e.g., a user device), such as a desktop computer, a mobile phone (e.g., a smart phone or a radiotelephone), a laptop computer, a tablet computer, a gaming device, a wearable communication device (e.g., a smart wristwatch, a pair of smart eyeglasses, or an activity band), a server, or a similar type of device. In some implementations, client device 220 may receive information related to a result of performing an analysis of information related to communications and/or operations of customer device 210 (e.g., from tester device 230), such as in association with client device 220 providing remote customer support services to customer device 210, as described elsewhere herein. Additionally, or alternatively, client device 220 may provide a service (e.g., a troubleshooting or a remote support service) to customer device 210 based on the result of performing the analysis, as described elsewhere herein.

Tester device 230 includes one or more devices capable of receiving, generating, storing, processing, and/or providing information associated with communications and/or operations of a device (e.g., customer device 210). For example, tester device 230 may include a user device, a client device, or a network device, as described elsewhere herein, or a similar type of device. In some implementations, tester device 230 may receive information from customer device 210 related to communications and/or operations of customer device 210, as described elsewhere herein. Additionally, or alternatively, tester device 230 may analyze the information to identify a source of an error related to the communications and/or operations of customer device 210 and may perform an action related to fixing the error, as described elsewhere herein.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of advanced generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
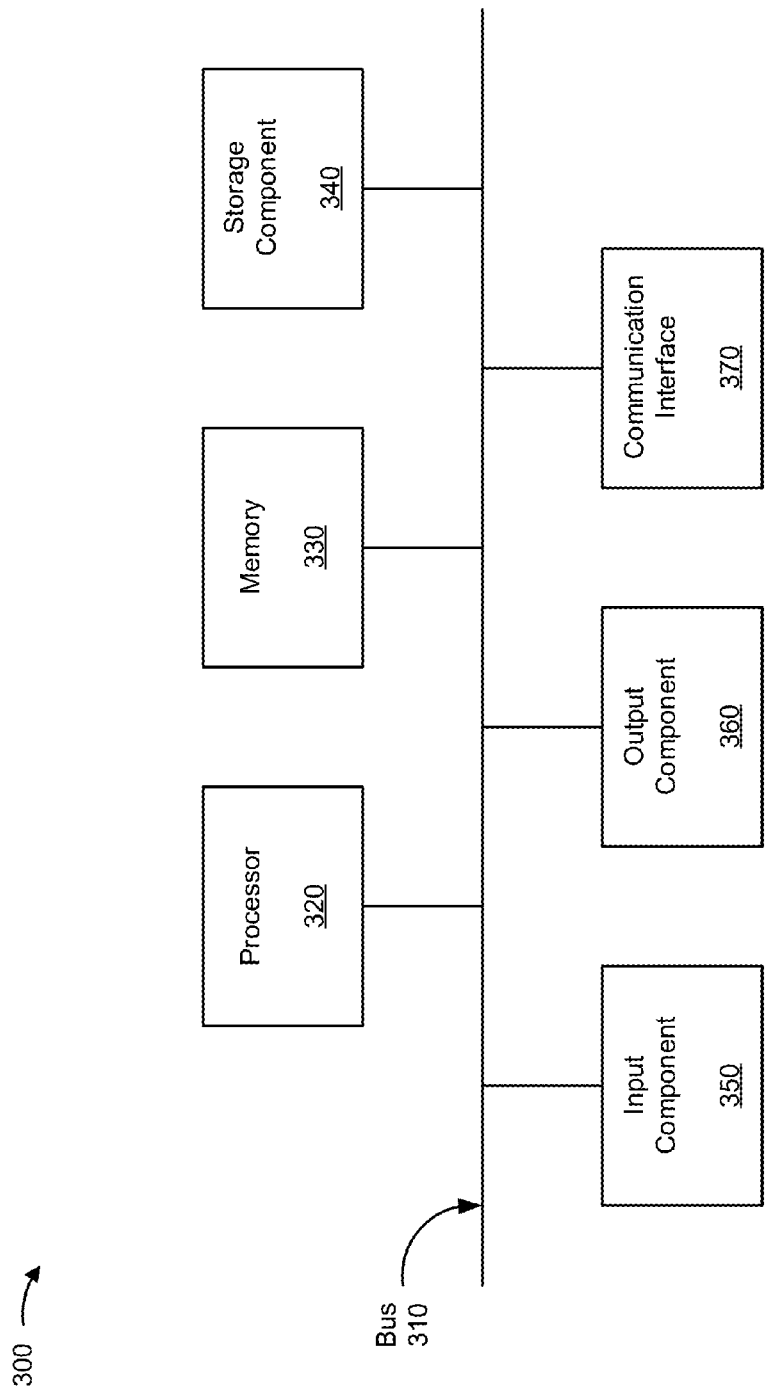
FIG. 3 is a diagram of example components of one or more devices of FIG. 2.

FIG. 3 is a diagram of example components of a device 300. Device 300 may correspond to customer device 210, client device 220, and/or tester device 230. In some implementations, customer device 210, client device 220, and/or tester device 230, may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for performing an analysis of information to identify a source of an error related to a device. In some implementations, one or more process blocks of FIG. 4 may be performed by tester device 230. In some implementations, one or more process blocks of FIG. 4 may be performed by another device or a group of devices separate from or including tester device 230, such as customer device 210 and/or client device 220.

As shown in FIG. 4, process 400 may include establishing a connection to a customer device using a set of protocols (block 410). For example, tester device 230 may establish a connection to customer device 210 using a set of protocols.

In some implementations, tester device 230 may establish a connection to customer device 210 via network 240. In some implementations, the connection may include a local connection. For example, tester device 230 may establish a connection to a wireless local area network (WLAN) gateway device or wireless access point that is connected to customer device 210, thereby connecting to customer device 210 via a LAN. This increases an efficiency of communicating with customer device 210 by reducing an amount of time for communications to be exchanged (e.g., relative to connecting to customer device 210 via a WAN). In addition, this conserves processing resources by reducing or eliminating exchanges of communications by devices other than customer device 210 and tester device 230. Additionally, or alternatively, the connection may include a remote connection or a connection via a non-local network 240. For example, tester device 230 may establish a connection to customer device 210 via a WAN. This improves identification of a source of the error by permitting a network administrator to provide remote support services to customer device 210 via tester device 230. In addition, this permits provisioning of remote support services, thereby improving identification of a source of an error.

In some implementations, tester device 230 may connect to customer device 210 using a set of protocols. In some implementations, the set of protocols may include UPnP protocols. Additionally, or alternatively, the set of protocols may include OMA DM protocols, such as OMA DM version 2.0. Additionally, or alternatively, tester device 230 may connect using Bluetooth, near field communication, and/or the like. In this way, tester device 230 may connect directly with customer device 210 (e.g., rather than connecting via a WAN or communicating with another system to connect to customer device 210). This conserves processing resources related to connecting to customer device 210 and reduces an amount of time related to sending/receiving communications, thereby increasing an efficiency of identifying a source of an error of customer device 210.

In some implementations, tester device 230 may establish a secure connection. For example, tester device 230 may use a transport layer security (TLS) protocol, a secure socket layer (SSL) protocol, and/or any other cryptographic protocol. Additionally, or alternatively, tester device 230 may connect using credentials (e.g., a username/password, a security certificate, a security token, a security key, and/or the like). This increases security of communications between tester device 230 and customer device 210 and/or security of network 240.

In this way, tester device 230 may connect directly to customer device 210, thereby permitting increased efficiency and conservation of processing/network resources when tester device 230 communicates with customer device 210.

As further shown in FIG. 4, process 400 may include receiving, from the customer device, information related to communications and/or operations of the customer device via use of the set of protocols (block 420). For example, tester device 230 may receive information related to communications and/or operations of customer device 210. In some implementations, tester device 230 may receive the information periodically, according to a schedule, upon requesting the information, and/or the like.

In some implementations, tester device 230 may receive the information in real-time or near real-time. Additionally, or alternatively, tester device 230 may receive historical information stored by customer device 210 and/or another device, such as client device 220.

In some implementations, tester device 230 may receive the information directly from customer device 210 (e.g., when tester device 230 is connected directly to customer device 210). Additionally, or alternatively, tester device 230 may receive the information from another customer device 210 (e.g., a peer customer device 210), such as a WLAN gateway device when tester device 230 is connected to a WLAN gateway device located at the premises of a customer rather than connected directly to customer device 210.

In some implementations, the information may be as determined (e.g., measured or identified) by customer device 210 (e.g., rather than as measured by a Wi-Fi frequency scanner, signal meter, and/or the like). For example, customer device 210 may measure or determine an SNR value of customer device 210, a channel being used by customer device 210 to communicate, and/or the like, and may provide the measured or determined information to tester device 230. In this way, tester device 230 improves accuracy of the information by reducing measurement errors that would occur from use of different technologies to determine the information. Furthermore, tester device 230 improves identification of a source of an error related to communications and/or operations of the device by using the same information as determined by customer device 210 to determine the source of the error.

In some implementations, tester device 230 may receive a variety of information related to communications and/or operations of customer device 210. In some implementations, the information may relate to or identify a quantity of devices connected to network 240 (or a WLAN gateway device of network 240). Additionally, or alternatively, the information may relate to or identify a received signal strength indicator (RSSI) value of a signal received by customer device 210.

Additionally, or alternatively, the information may relate to or identify a signal-to-noise ratio (SNR) value of a signal received by customer device 210. Additionally, or alternatively, the information may relate to or identify a line attenuation value of a signal received by customer device 210. Additionally, or alternatively, the information may relate to or identify a transmit/receive power value of a transmission of customer device 210. Additionally, or alternatively, the information may relate to or identify a signal quality value of a signal received by customer device 210.

Additionally, or alternatively, the information may relate to or identify a physical layer (PHY) rate (e.g., a bit rate) of communications to and/or from customer device 210. Additionally, or alternatively, the information may relate to or identify a noise floor value of noise generated by different signals. Additionally, or alternatively, the information may relate to or identify a channel saturation and utilization value of a channel being used by customer device 210 to communicate. Additionally, or alternatively, the information may relate to a bit error rate (e.g., a quantity of bit errors per unit time). Additionally, or alternatively, the information may relate to a bit error ratio (e.g., a quantity of bit errors divided by a total quantity of transferred bits during a time period).

Additionally, or alternatively, the information may relate to or identify a congestion/interference value of a channel used by customer device 210. Additionally, or alternatively, the information may relate to or identify a throughput/packet loss value of communications to/from customer device 210. Additionally, or alternatively, the information may relate to or identify non-802.11 interference sources (e.g., a microwave oven, a cordless phone, or a Bluetooth device) that may be interfering with customer device 210.

Additionally, or alternatively, the information may relate to or identify a customer device 210 speed (e.g., upload/download speed or processing speed) of customer device 210. Additionally, or alternatively, the information may relate to or identify a combination of speeds of multiple customer devices 210. Additionally, or alternatively, the information may relate to or identify a quantity of spatial streams that customer device 210 is using to communicate. Additionally, or alternatively, the information may relate to or identify a channel width value of a channel used by customer device 210 (e.g., in terms of megahertz (MHz)).

Additionally, or alternatively, the information may relate to or identify an airtime availability value of a channel used by customer device 210. Additionally, or alternatively, the information may relate to or identify a 40/80/160 MHz configuration indicator of customer device 210 indicating that customer device 210 may use 40, 80, or 160 MHz of bandwidth to communicate. Additionally, or alternatively, the information may relate to or identify a Modulation and Coding Scheme (MCS) index value of customer device 210. Additionally, or alternatively, the information may relate to or identify a noise value of different signals.

In this way, tester device 230 may receive information related to communications and/or operations of customer device 210, such as directly from customer device 210 and as customer device 210 has determined the information.

As further shown in FIG. 4, process 400 may include performing an analysis of the information to identify a source of an error related to the communications and/or operations of the customer device (block 430). For example, tester device 230 may perform an analysis of the information to identify a source of an error related to the communications and/or operations of customer device 210. In some implementations, tester device 230 may perform the analysis when tester device 230 receives the information, based on input by a user of tester device 230, and/or the like.

In some implementations, tester device 230 may perform different types of analyses. For example, tester device 230 may perform analyses in different manners, using different information, and/or the like. In some implementations, tester device 230 may determine whether the information satisfies a threshold. For example, tester device 230 may determine whether an RSSI value, an SNR value, and/or the like, satisfies a threshold.

In some implementations, tester device 230 may compare information from different customer devices 210. In some implementations, tester device 230 may compare information of different customer devices 210 connected to the same network 240 to compare communications and/or operations of different customer devices 210. Additionally, or alternatively, tester device 230 may compare information of customer device 210 and another customer device 210 connected to a different network 240, the information of customer device 210 and expected information (e.g., as described in specifications or other documentation related to customer device 210), the information of customer device 210 and historical information of the same customer device 210, and/or the like. In this way, tester device 230 may determine whether an error is caused by a customer device 210-related error or a network 240-related error, thereby improving identification of an error associated with customer device 210.

In some implementations, tester device 230 may determine a score based on the information. For example, tester device 230 may determine a score based on the information satisfying a threshold (e.g., an RSSI or an SNR value satisfying a threshold), a combination of different information satisfying a threshold (e.g., a combination of RSSI and SNR), and/or the like. In some implementations, tester device 230 may determine whether the score satisfies a threshold. In some implementations, tester device 230 may perform an action when the score satisfies a threshold, as described elsewhere herein. This conserves processing resources by reducing a quantity of actions that tester device 230 performs and permits tester device 230 to quickly and efficiently identify a source of the error (e.g., by preventing tester device 230 from performing an action or identifying a source of the error when a generated score does not satisfy a threshold).

In some implementations, tester device 230 may analyze the information in a particular order. For example, tester device 230 may determine whether a PHY rate satisfies a threshold before determining whether an SNR value satisfies a threshold. In this way, tester device 230 may quickly, efficiently, and accurately identify a source of an error via a process-of-elimination type analysis, thereby improving identification of a source of an error and conserving processing resources.

In some implementations, tester device 230 may perform a test of customer device 210. In some implementations, tester device 230 may perform a throughput test. For example, tester device 230 may perform an uplink/upstream and/or downlink/downstream throughput test (e.g., by determining a quantity of packets that can be exchanged with customer device 210). In some implementations, tester device 230 may provide a set of instructions and/or a command to customer device 210 to cause customer device 210 to perform an action related to the test. In this way, tester device 230 may identify a source of an error, such as a throughput error.

In some implementations, tester device 230 may perform an analysis of information for, and/or perform a test of, a single customer device 210 at a time. For example, tester device 230 may perform a serial test by testing a first customer device 210 prior to testing a second customer device 210. In this way, tester device 230 conserves processing resources by reducing or eliminating a need to test remaining customer devices 210 when a source of an error is identified.

Additionally, or alternatively, tester device 230 may perform an analysis of information for, and/or perform a test of, multiple devices simultaneously. For example, tester device 230 may perform a parallel test by testing a first customer device 210 and a second customer device 210 simultaneously. In this way, tester device 230 reduces an amount of time for identifying a source of an error, thereby increasing efficiency of identifying a source of the error.

In some implementations, tester device 230 may dynamically test customer device 210. In some implementations, tester device 230 may change a frequency spectrum used by customer device 210 (e.g., by changing the frequency spectrum used by customer device 210 to/from a 5 gigahertz (GHz) frequency spectrum or a 2.4 GHz frequency spectrum). Additionally, or alternatively, tester device 230 may change a channel used by customer device 210 for communications (e.g., by sending a set of instructions to customer device 210 or calling a function of customer device 210 to cause customer device 210 to use a different channel).

In some implementations, tester device 230 may receive data related to the test (e.g., from customer device 210 as the test is being performed or after the test is performed). In some implementations, tester device 230 may dynamically adjust the test of customer device 210 based on the data (e.g., by changing a frequency spectrum and/or a channel used by customer device 210). In this way, tester device 230 may dynamically, quickly, and efficiently analyze and/or troubleshoot customer device 210, thereby conserving processing resources and increasing an efficiency of analyzing customer device 210.

In some implementations, tester device 230 may identify a source of an error related to communications and/or operations of customer device 210. In some implementations, tester device 230 may identify a source of an error when information related to communications and/or operations of customer device 210 satisfies a threshold. Additionally, or alternatively, tester device 230 may identify a source of an error when a result of a test satisfies a threshold or generates a particular result (e.g., when a throughput test satisfies a threshold throughput).

In some implementations, tester device 230 may store a result of the analysis and/or a result of identifying the source of the error (e.g., locally, using client device 220, and/or a centralized device). In some implementations, tester device 230 may use the stored result to identify a source of an error related to a different customer device 210, to identify a source of a different error for the same customer device 210, and/or to enable another tester device 230 to identify the source of an error for the same, or a different, customer device 210. This improves future analysis via the use of a result for a historical analysis.

In this way, tester device 230 may perform an analysis of information related to communications and/or operations of customer device 210 to identify a source of an error related to the communications and/or operations of customer device 210.

As further shown in FIG. 4, process 400 may include performing an action related to the error based on performing the analysis (block 440). For example, tester device 230 may perform an action based on identifying the source of the error, such as to facilitate fixing of the error.

In some implementations, tester device 230 may provide information identifying the source of the error (e.g., for display via tester device 230 and/or to client device 220 of remote support). In some implementations, tester device 230 may generate an issue ticket and escalate a case to another level of support (e.g., by sending a message to client device 220 of a technician).

In some implementations, tester device 230 may perform an action related to customer device 210. In some implementations, tester device 230 may re-provision bandwidth between customer device 210 and another device (e.g., a WLAN gateway device). Additionally, or alternatively, tester device 230 may retrieve a software update for customer device 210 and may provide the software update to customer device 210, or send a set of instructions to customer device 210 to update the software of customer device 210. Additionally, or alternatively, tester device 230 may select a different channel for customer device 210 to use and/or send a set of instructions to cause customer device 210 to use the other channel.

In some implementations, tester device 230 may generate a recommendation related to customer device 210. In some implementations, tester device 230 may generate a recommendation to adjust a physical location of customer device 210 (e.g., to a portion of a building with a better signal than where customer device 210 is located, as determined using signal-related information from peer customer devices 210). Additionally, or alternatively, tester device 230 may recommend that a technician install an extender (e.g., a Wi-Fi extender), such as to improve a signal strength for customer device 210.

In this way, tester device 230 may perform an action related to fixing the error based on identifying the source of the error, thereby improving communications and/or operations of customer device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5D are flowcharts of an example process 500 relating to example process 400 shown in FIG. 4. FIGS. 5A-5D show an example of performing an analysis of information related to communications and/or operations of customer device 210 to identify a source of an error related to customer device 210. For example, FIGS. 5A-5D describe an example that includes identifying a source of decreased video quality of video data for customer device 210 (e.g., a set-top box). In some implementations, one or more process blocks of FIGS. 5A-5D may be performed by tester device 230. In some implementations, one or more process blocks of FIGS. 5A-5D may be performed by another device or a group of devices separate from or including tester device 230, such as customer device 210 and client device 220.

Figure 5A:
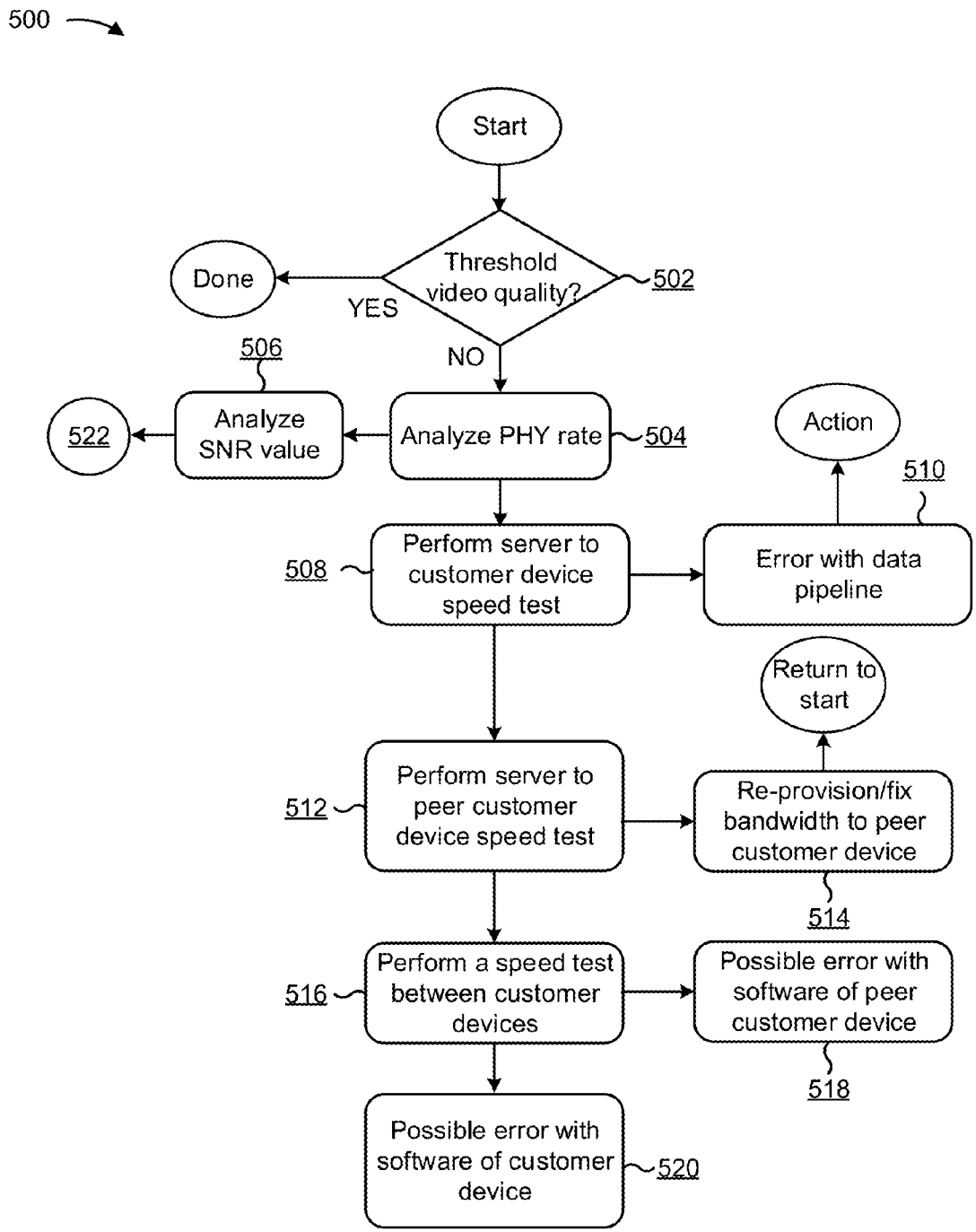
FIGS. 5A-5D are flow charts of an example process relating to the example process shown in FIG. 4.

As shown in FIG. 5A, process 500 may include analyzing a video quality of customer device 210 (block 502). In some implementations, tester device 230 may determine whether the video quality of customer device 210 satisfies a threshold, such as by determining whether a packet loss rate for the video data satisfies a threshold, whether a bit rate of the video data satisfies a threshold, whether blurring, or other pixel-related information, satisfies a threshold, and/or the like. Additionally, or alternatively, tester device 230 may receive an indication from customer device 210 (e.g., based on input from a user of customer device 210) that the video quality does not satisfy a threshold.

In some implementations, and as further shown FIG. 5A, if tester device 230 determines that the video quality of customer device 210 satisfies a threshold (block 502—YES), then process 500 may include determining that the analysis is complete (e.g., shown as "Done"). In some implementations, tester device 230 may monitor video data or idle based on determining that the video quality satisfies the threshold, thereby conserving processing and/or power resources of tester device 230.

In some implementations, if tester device 230 determines that the video quality of the device does not satisfy a threshold, or satisfies a different threshold (block 502—NO), then process 500 may include analyzing a PHY rate of customer device 210 (e.g., a rate at which customer device 210 is communicating with a peer customer device 210) (block 504). For example, tester device 230 may determine whether the PHY rate of customer device 210 satisfies a threshold.

In some implementations, if tester device 230 determines that the PHY does not satisfy a threshold, then process 500 may include analyzing an SNR value (e.g., a current SNR value) of customer device 210 (block 506). Analyzing the SNR value is described in more detail below with respect to block 522 in FIG. 5B.

Returning to block 504, in some implementations, if tester device 230 determines that the PHY rate of customer device 210 satisfies a threshold, then process 500 may include performing a speed test between a server and customer device 210 (block 508). For example, tester device 230 may determine a data transfer rate between a server providing video data and customer device 210. In some implementations, tester device 230 may determine whether a result of the speed test satisfies a threshold.

In some implementations, if tester device 230 determines that the speed between a server and customer device 210 satisfies a threshold, then process 500 may include determining that there is an error with a data pipeline (block 510). For example, tester device 230 may determine that there is an error with a video pipeline used to provide the video data. In this way, tester device 230 may identify a source of an error. Additionally, or alternatively, when tester device 230 determines that there may be an error with the data pipeline, process 500 may include performing an action based on identifying the data pipeline as a source of the error (e.g., shown by "Action"). For example, tester device 230 may escalate the error by sending a message to client device 220 (e.g., of a technician or remote support) to indicate that additional technical support may be needed to fix the error.

Returning to block 508, in some implementations, if tester device 230 determines that the speed between a server and customer device 210 does not satisfy a threshold, then process 500 may include performing another speed test between a server and a peer customer device 210 (e.g., for a different customer device 210 than the previously described speed test) (block 512). For example, tester device 230 may determine whether a data rate between a server and a WLAN gateway device or a broadband home router at a customer premises, to which the particular customer device 210 experiencing the error is connected, satisfies a threshold.

In some implementations, if tester device 230 determines that a result of the speed test between a server and a peer customer device 210 does not satisfy a threshold, then process 500 may include re-provisioning and/or fixing bandwidth to the peer customer device 210 (block 514). For example, tester device 230 may re-provision and/or fix bandwidth to a WLAN gateway device or a broadband home router at a customer premises by sending a message to the WLAN gateway device or the broadband home router, adjusting a setting of the WLAN gateway device or the broadband home router, and/or the like. Additionally, or alternatively, tester device 230 may send a report or a message to a service provider. Additionally, or alternatively, process 500 may include returning to the start the analysis (e.g., shown by "Return to start"). For example, tester device 230 may monitor video quality of video data.

Returning to block 512, in some implementations, if tester device 230 determines that the result of the speed test between a server and a peer customer device 210 satisfies a threshold, then process 500 may include performing a speed test between customer device 210 and a peer customer device 210 (e.g., between a set-top box and a WLAN gateway device or broadband home router) (block 516). For example, tester device 230 may determine whether a data transfer rate between customer device 210 and the peer customer device 210 satisfies a threshold by causing data to be sent from customer device 210 to the peer customer device 210 and determining the data transfer rate.

In some implementations, if tester device 230 determines that the speed between customer device 210 and the peer customer device 210 satisfies a threshold, then process 500 may include determining that the software of the peer customer device 210 is a possible source of the error (block 518). For example, tester device 230 may determine that the software (e.g., routing software of a WLAN gateway device to which a set-top box is connected) of the peer customer device 210 may be the source of the error. In some implementations, tester device 230 may determine that the issue may need to be escalated to another level of support, that the peer customer device 210 may need a software update, and/or the like. In this way, tester device 230 may identify a source of an error related to communications and/or operations of customer device 210.

Returning to block 520, in some implementations, if tester device 230 determines that the speed between customer device 210 and the peer customer device 210 does not satisfy a threshold, then process 500 may include determining that a possible source of the error is software of customer device 210 (block 520). For example, tester device 230 may determine that the software of customer device 210, rather than of a peer customer device 210, is the source of the error. In some implementations, tester device 230 may determine that the issue may need to be escalated to another level of support, that customer device 210 may need a software update, and/or the like. In this way, tester device 230 may identify a source of an error related to communications and/or operations of customer device 210.

Figure 5B:
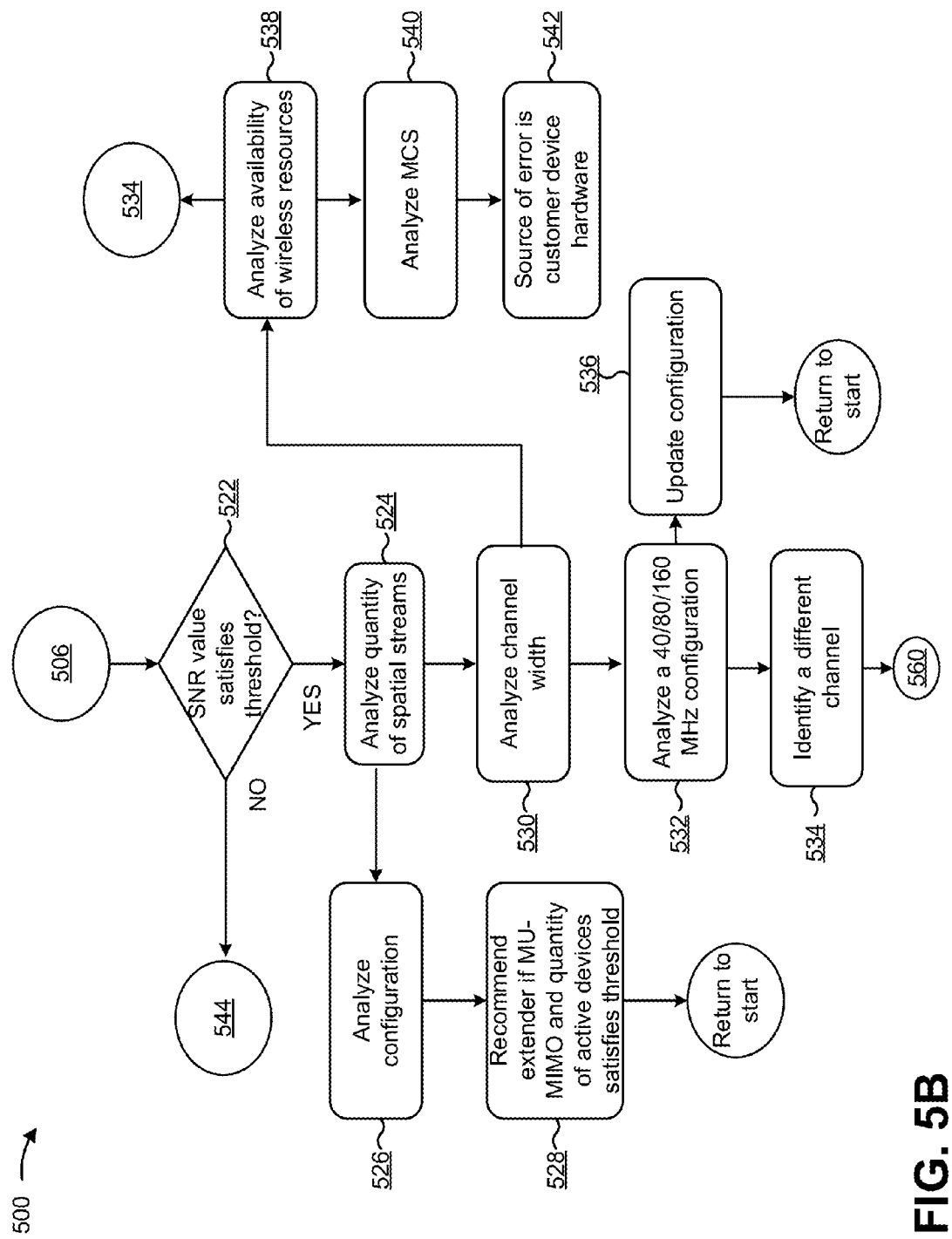

As shown in FIG. 5B, when analyzing an SNR value of customer device 210 (block 506 of FIG. 5A), process 500 may include determining whether the SNR value satisfies a threshold (block 522). In some implementations, if the SNR value does not satisfy a threshold (block 522—NO), then process 500 may include analyzing an RSSI value of customer device 210, as described below with respect to block 544 of FIG. 5C.

In some implementations, if tester device 230 determines that the SNR value satisfies a threshold (block 522—YES), then process 500 may include analyzing a quantity of spatial streams (e.g., a quantity of data signals) being used by customer device 210 to communicate to a peer customer device 210 (block 524). For example, tester device 230 may determine whether the quantity of spatial streams satisfies a threshold, is less than a maximum quantity or a default quantity of spatial streams, and/or the like.

In some implementations, if tester device 230 determines that a quantity of spatial streams does not satisfy a threshold, then process 500 may include analyzing a configuration of customer device 210 (block 526). For example, tester device 230 may determine whether customer device 210 has a particular setting enabled, a particular software configuration, and/or the like. In some implementations, tester device 230 may perform an update (e.g., of software) and/or modify a setting of customer device 210, such as to ensure customer device 210 is using an updated version of software and/or a particular setting.

In some implementations, when tester device 230 analyzes a configuration of customer device 210, process 500 may include generating a recommendation to use an extender if multi-user multiple-input and multiple-output (MU-MIMO) is enabled on customer device 210 and a quantity of active devices (e.g., a quantity of customer devices 210 communicating via a WLAN gateway device or a broadband home router) satisfies a threshold (block 528). For example, tester device 230 may determine whether MU-MIMO is enabled based on analyzing the configuration of customer device 210. Additionally, or alternatively, tester device 230 may return to the start of the analysis (e.g., shown by "Return to start"). For example, tester device 230 may monitor video quality of video data after generating the recommendation. In this way, tester device 230 may identify a source of an error related to communications and/or operations of customer device 210 and may generate a recommendation to facilitate fixing of the error.

Returning to block 524, in some implementations, if tester device 230 determines that the quantity of spatial streams satisfies a threshold, then process 500 may include analyzing a channel width of a channel (block 530). For example, tester device 230 may determine a quantity of MHz of the channel being used by customer device 210 to communicate. In some implementations, tester device 230 may determine whether the channel width satisfies a threshold.

In some implementations, if tester device 230 determines that the channel width does not satisfy a threshold, then process 500 may include analyzing whether a 40/80/160 MHz channel width configuration is enabled for customer device 210 (block 532). For example, tester device 230 may determine whether customer device 210 can communicate using 40, 80, and/or 160 MHz of bandwidth. In some implementations, if tester device 230 determines that a 40/80/160 MHz channel width configuration is enabled, the process 500 may include identifying a different channel for customer device 210 to use to communicate (block 534). For example, tester device 230 may identify a channel with less traffic relative the channel customer device 210 is using, a lower quantity of customer devices 210 using the channel relative to the channel customer device 210 is using, and/or the like, as described below with respect to block 560 of FIG. 5C.

In some implementations, if tester device 230 determines that a 40/80/160 MHz channel width configuration is not enabled for customer device 210 (as described with respect to block 532), then process 500 may include updating the configuration of customer device 210 (block 536). For example, tester device 230 may update the configuration of tester device 230 by enabling a 40/80/160 MHz configuration by updating software, modifying a setting, and/or the like. In some implementations, process 500 may include returning to the start of the analysis (e.g., shown by "Return to start"). For example, tester device 230 may monitor video quality of video data. In this way, tester device 230 may perform an action to facilitate fixing of an error.

In some implementations, if tester device 230 determines that a channel width satisfies a threshold (as described above with respect to block 530), then process 500 may include analyzing an availability of wireless resources (block 538). For example, tester device 230 may analyze an availability of bandwidth or airtime after analyzing a channel width of a channel being used by tester device 230.

In some implementations, tester device 230 may determine whether a threshold amount of a particular wireless resource is available for customer device 210 to use to communicate (e.g., based on a quantity of peer customer devices 210 consuming the same wireless resource, based on an amount of traffic being exchanged via the particular wireless resource, etc.). In some implementations, if tester device 230 determines that an amount of available wireless resources does not satisfy a threshold, then process 500 may include returning to block 534. For example, tester device 230 may identify a different channel for customer device 210 to use.

Returning to block 538, in some implementations, if tester device 230 determines that the amount of available wireless resources satisfies a threshold, then process 500 may include analyzing a modulation and coding scheme (MCS) of customer device 210 (block 540). For example, tester device 230 may use an MCS to determine a data rate (e.g., megabits per second (Mb/s) or megabytes per second (MB/s)) at which customer device 210 is communicating. In some implementations, tester device 230 may determine whether the data rate of customer device 210 satisfies a threshold.

In some implementations, if the data rate does not satisfy a threshold (e.g., seven Mb/s, 20 MB/s, etc.), then process 500 may include determining that a source of the error is hardware of customer device 210 (block 542). For example, tester device 230 may determine that the source of the error is hardware (e.g., a chip) of customer device 210. In this way, tester device 230 may identify a source of an error related to communications and/or operations of customer device 210. In some implementations, when tester device 230 determines that the hardware of customer device 210 is the source of the error, tester device 230 may generate a recommendation to replace customer device 210. In some implementations, if tester device 230 determines that the data rate satisfies a threshold, then tester device 230 may analyze other information, generate another recommendation, and/or the like.

Figure 5C:
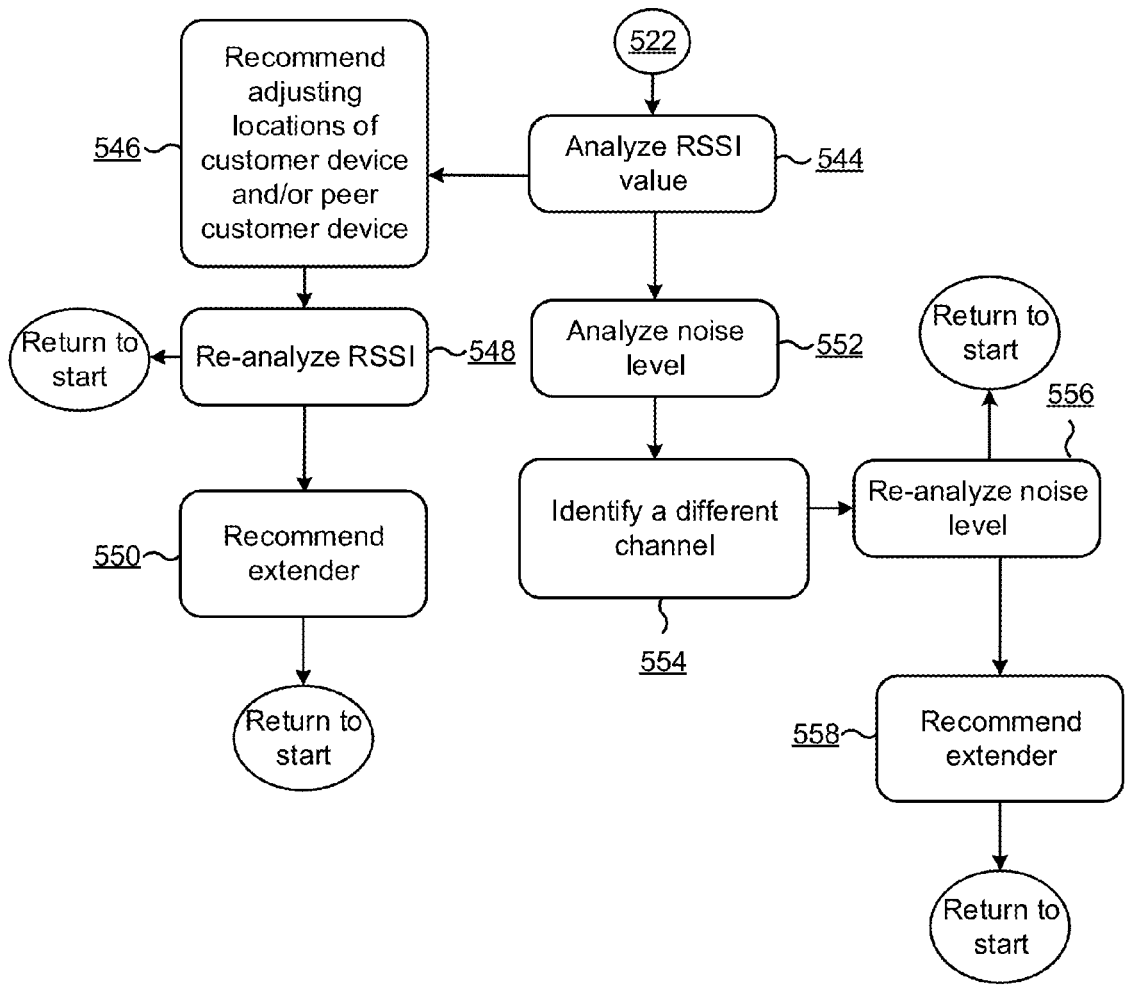

As shown in FIG. 5C, if tester device 230 determines that an SNR value of customer device 210 does not satisfy a threshold (as described above with respect to block 522 of FIG. 5B), then process 500 may include analyzing an RSSI value (e.g., a current RSSI value) of customer device 210 (block 544). For example, tester device 230 may determine whether the RSSI value satisfies a threshold.

In some implementations, if tester device 230 determines that the RSSI value for customer device 210 does not satisfy a threshold, then process 500 may include generating a recommendation to adjust the physical locations of customer device 210 and/or peer customer device 210 within a customer premises (block 546). For example, tester device 230 may generate a recommendation to adjust the physical location of customer device 210 and/or peer customer device 210 within a customer premises. In some implementations, tester device 230 may recommend a physical location based on an RSSI value of another peer customer device 210.

In some implementations, process 500 may include re-analyzing the RSSI value of customer device 210 (block 548). For example, tester device 230 may re-analyze the RSSI value of customer device 210 after receiving an indication that a technician has physically moved customer device 210 and/or peer customer device 210 to a different location and may determine whether the RSSI value of customer device 210 satisfies a threshold. In some implementations, if tester device 230 determines that the re-analyzed RSSI value satisfies a threshold, then process 500 may include returning to the start of the analysis (e.g., shown by "Return to start"). For example, tester device 230 may monitor video quality of video data.

In some implementations, if tester device 230 determines that the re-analyzed RSSI value does not satisfy a threshold, tester device 230 may generate a recommendation to use an extender (block 550). For example, tester device 230 may generate a recommendation to use a multimedia over coax alignment (MoCA) extender and/or an Ethernet extender, such as to improve signal strength of a signal received by customer device 210. In some implementations, process 500 may include returning to the start of the analysis (e.g., shown by "Return to start"). For example, tester device 230 may monitor video quality of video data after generating the recommendation.

Returning to block 544, in some implementations, if tester device 230 determines that the RSSI value satisfies a threshold, then process 500 may include analyzing a noise level (e.g., a current noise level) of the channel being used by customer device 210 to communicate (block 552). For example, tester device 230 may determine whether the noise level satisfies a threshold.

In some implementations, if tester device 230 determines that the noise level satisfies a threshold, then process 500 may include identifying a different channel for customer device 210 to use to communicate (block 554). For example, tester device 230 may identify a channel that has a lower noise level relative to the channel being used by customer device 210.

Additionally, or alternatively, tester device 230 may generate a recommendation to adjust a location of customer device 210 (e.g., to a portion of a customer premises that has a lower noise level, based on noise levels determined for peer customer devices 210). In this way, tester device 230 may generate a recommendation to facilitate fixing of an error related to communications and/or operations of customer device 210. In some implementations, if tester device 230 determines that the noise level does not satisfy a threshold, then process 500 may include providing a message to another device, such as to escalate resolution of the error to another level of support.

In some implementations, process 500 may include re-analyzing a noise level (block 556). For example, tester device 230 may determine whether a noise level satisfies a threshold after receiving an indication that customer device 210 has been moved to a different location and/or after identifying another channel for customer device 210 to use.

In some implementations, if tester device 230 determines that the re-analyzed noise level does not satisfy a threshold, then process 500 may include returning to the start of the analysis (e.g., shown by "Return to start"). For example, tester device 230 may monitor video quality of video data.

In some implementations, if tester device 230 determines that the noise level satisfies a threshold, then process 500 may include generating a recommendation to use an extender (block 558). For example, tester device 230 may generate a recommendation to use a MoCA extender and/or an Ethernet extender, such as to improve a signal received by customer device 210. In some implementations, process 500 may include returning to the start of the analysis after generating the recommendation (e.g., monitoring video quality of video data). In this way, tester device 230 may generate a recommendation to facilitate fixing of an error related to communications and/or operations of customer device 210.

Figure 5D:
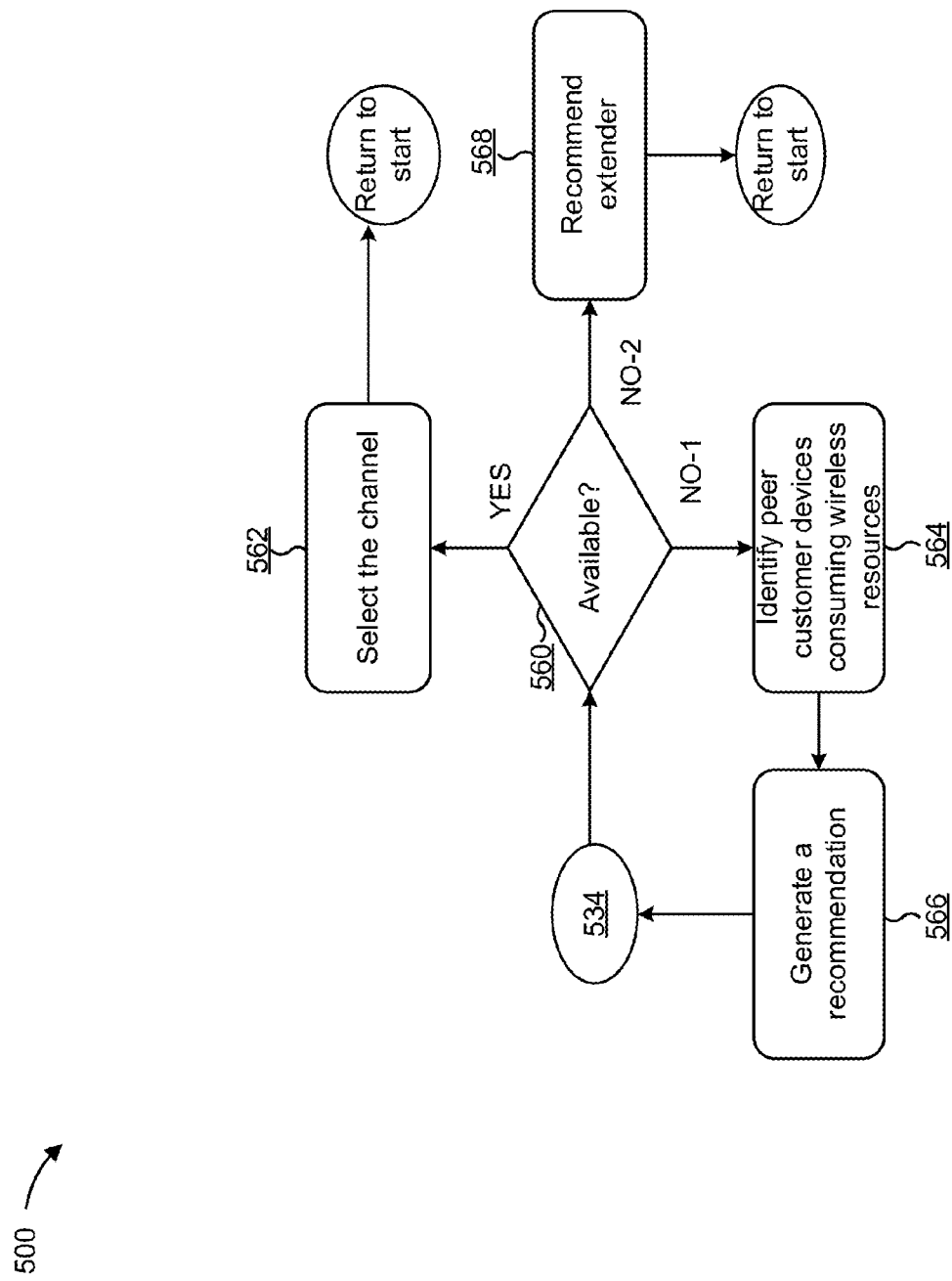

As shown in FIG. 5D, after identifying a different channel (as described above with respect to block 534 in FIG. 5B), tester device 230 may determine whether the identified channel is available (block 560). For example, tester device 230 may determine whether traffic on the channel satisfies a threshold, whether a threshold quantity of devices are communicating via the channel, and/or the like.

In some implementations, if tester device 230 determines that the identified channel is available (block 560—YES), then process 500 may include selecting the channel (block 562) and and/or returning to the start of the analysis (e.g., shown by "Return to start"). For example, tester device 230 may select the channel and/or monitor video quality of video data.

In some implementations, if tester device 230 determines that the identified channel is not available (block 560—NO-1), then process 500 may include identifying peer customer devices 210 that are consuming wireless resources of the identified channel (block 564). For example, tester device 230 may identify a wireless printer, a laptop computer, and/or the like, that are consuming wireless resources (e.g., bandwidth or airtime) of the channel.

In some implementations, tester device 230 may determine a rank for the peer customer devices 210 based on an amount of wireless resources the peer customer devices 210 are consuming (e.g., from highest amount to lowest amount or from lowest amount to highest amount). Additionally, or alternatively, tester device 230 may determine a protocol used by the peer customer devices 210 that are communicating using the identified channel, or another configuration of the peer customer devices 210. For example, tester device 230 may determine whether the peer customer device 210 are using an 802.11b, g, n, and/or ac protocol to communicate. In some implementations, tester device 230 may identify peer customer devices 210 that are using a particular protocol, or that have a particular configuration (e.g., to generate a recommendation for the peer customer devices 210).

In some implementations, when tester device 230 identifies peer customer devices 210 that are consuming wireless resources, tester device 230 may generate a recommendation related to the peer customer devices 210 (block 566). For example, tester device 230 may generate a recommendation based on determining the protocol, or other configuration, associated with the peer customer devices 210. In some implementations, tester device 230 may generate a recommendation to power down peer customer devices 210 that are using a particular protocol (e.g., a protocol that is older relative to another protocol) or that have a particular configuration Additionally, or alternatively, tester device 230 may send a message to peer customer devices 210 that are using a particular protocol, or have a particular configuration, to power down.

Additionally, or alternatively, tester device 230 may update, or send a message to a peer customer device 210 to update software of peer customer device 210, such as to cause the peer customer device 210 to use a different protocol or configuration. In some implementations, after generating the recommendation, process 500 may include returning to block 534 (as described above with respect to FIG. 5B). For example, tester device 230 may identify a different channel and repeat blocks 560, 564 and 566. In this way, tester device 230 may make determinations of whether various channels are available for communications, thereby improving communications and/or operations of customer device 210.

In some implementations, if tester device 230 determines that the identified channel is not available (block 560—NO-2), then process 500 may include generating a recommendation to use an extender (block 568). For example, tester device 230 may generate a recommendation to use a MoCA extender and/or an Ethernet extender to improve communications of customer device 210. In some implementations, when tester device 230 generates the recommendation, process 500 may include returning to the start of the analysis (e.g., shown by "Return to start"). For example, tester device 230 may monitoring video quality of video data).

In this way, tester device 230 may perform an analysis of information related to communications and/or operations of customer device 210 and may perform an action related to facilitating fixing of an error in the communications and/or operations of customer device 210.

As indicated above, FIGS. 5A-5D are provided merely as an example. Other examples are possible and may differ from what was described with regard to FIGS. 5A-5D. For example, although FIGS. 5A-5D refer to video data, the implementations described with respect to FIGS. 5A-5D may be applicable to other types of data, such as audio data, text data, and/or the like. In addition, although FIGS. 5A-5D refer to a WLAN gateway device, a broadband home router, and a set-top box as examples of customer devices 210, the implementations described with respect to FIGS. 5A-5D may be applicable to other types of customer devices 210. Further, other examples may include additional steps, fewer steps, different steps, or differently arranged steps than those depicted in FIGS. 5A-5D. Additionally, or alternatively, two or more of the blocks of process 500 may be performed in parallel.

Figure 6:
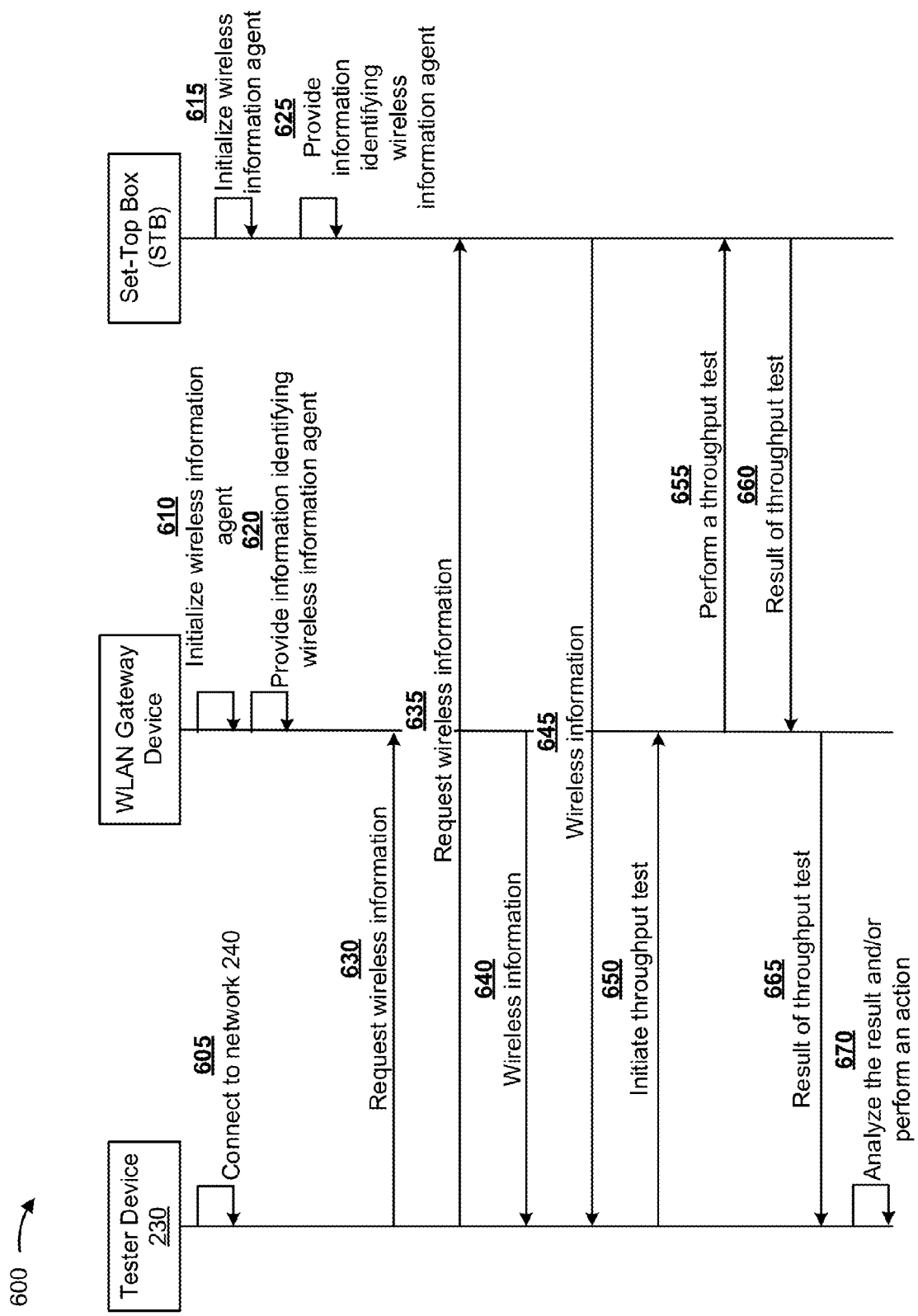
FIG. 6 is a call flow diagram of an example implementation relating to the example process shown in FIG. 4.

FIG. 6 is a diagram of an example implementation 600 relating to example process 400 shown in FIG. 4. FIG. 6 shows an example of analyzing a wireless connection to determine a source of an error related to the wireless connection. Example implementation 600 includes tester device 230 and multiple customer devices 210 (e.g., a WLAN gateway device and a set-top box (STB)).

As shown in FIG. 6, and by reference number 605, tester device 230 may connect to network 240. For example, tester device 230 may connect to a WLAN at a customer premises. As shown by reference number 610, a WLAN gateway device may initialize one or more wireless information agents. In some implementations, a wireless information agent may record information related to wireless communications of the WLAN gateway device, such as information that identifies a channel via which the WLAN gateway device is communicating, a data rate of the WLAN gateway device, and/or the like. As shown by reference number 615, an STB may initialize one or more similar wireless information agents.

As shown by reference number 620, the WLAN gateway device may provide information identifying the presence of the one or more wireless information agents. For example, the WLAN gateway device may provide the information identifying the one or more wireless information agents using a broadcast message, a multicast message, a unicast message, and/or the like. Additionally, or alternatively, the WLAN gateway device may provide information identifying customer devices 210 connected to, or associated with, the WLAN gateway device (e.g., information identifying a service set with a service set identifier (SSID) that includes the STB). As shown by reference number 625, the STB may provide information identifying the one or more wireless information agents of the STB in a manner similar to that described with respect to the WLAN gateway device.

As shown by reference number 630, tester device 230 may provide a communication to the WLAN gateway device to request wireless information (e.g., as recorded by the one or more wireless information agents of the WLAN gateway device). In some implementations, wireless information may include information relating to a wireless signal and/or use of the wireless signal. For example, the wireless information may include an RSSI value related to the wireless signal, an amount of traffic on a particular wireless channel, a quantity of devices connected to a WLAN gateway device, and/or the like. As shown by reference number 635, tester device 230 may provide a communication to the STB via the WLAN gateway device to request wireless information from the STB.

As shown by reference number 640, the WLAN gateway device may provide a communication to tester device 230 to provide the requested wireless information to tester device 230. For example, the WLAN gateway device may provide the information to tester device 230 using UPnP and/or OMA DM protocols. As shown by reference number 645, the STB may provide a communication to tester device 230 to provide the requested wireless information to tester device 230 (e.g., via the WLAN gateway device). For example, the STB may provide the wireless information using UPnP and/or OMA DM protocols.

As shown by reference number 650, tester device 230 may provide a communication to the WLAN gateway device to initiate a throughput test. For example, tester device 230 may provide data destined for the STB at a particular data rate. As shown by reference number 655, the WLAN gateway device may provide a communication to the STB to perform a throughput test. For example, the WLAN gateway device may provide the data from tester device 230 to the STB at a particular data rate.

As shown by reference number 660, the STB may provide a communication to the WLAN gateway device to provide information identifying a result of the throughput test between the STB and the WLAN gateway device. For example, the information may identify a quantity of errors (e.g., packet loss) related to the data received by the STB, a data rate at which the STB received the data, and/or the like. As shown by reference number 665, the WLAN gateway device may provide a communication to tester device 230 to provide the result of the throughput test to tester device 230.

As shown by reference number 670, tester device 230 may analyze a result of the throughput test and/or perform an action based on a result of a throughput test. For example, tester device 230 may determine whether a data rate of the throughput test satisfies a threshold and/or may perform an action to facilitate fixing of an error related to communications and/or operations of the WLAN gateway device and/or the STB. In this way, tester device 230 may improve communications and/or operations of customer device 210.

As indicated above, FIG. 6 is provided merely as an example. Other examples are possible and may differ from what was described with regard to FIG. 6. For example, although example implementation 600 includes a WLAN gateway device and a STB, other implementations may include additional or different customer devices 210. In addition, other examples may include data other than wireless information.

FIGS. 7A-7E are diagrams of an example implementation 700 relating to example process 400 shown in FIG. 4. Example implementation 700 includes tester device 230.

Figure 7A:
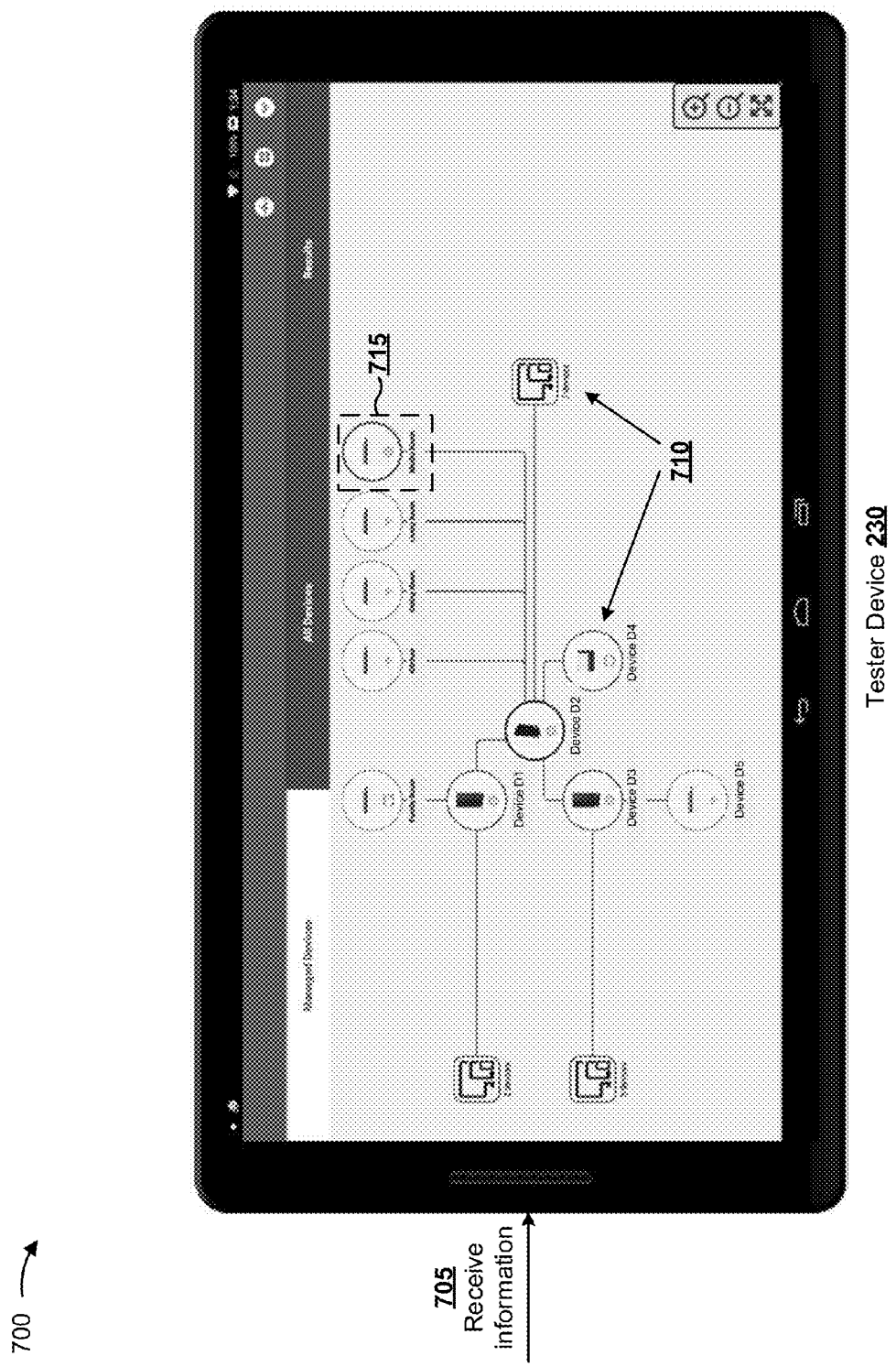
FIGS. 7A-7E are diagrams of an example implementation relating to the example process shown in FIG. 4.

As shown in FIG. 7A, and by reference number 705, tester device 230 may receive information related to communications and/or operations of customer device 210. For example, tester device 230 may receive the information from customer device 210 via UPnP and/or OMA DM protocols.

As shown by reference number 710, tester device 230 may display information identifying customer devices 210 connected to network 240 and/or information related to customer devices 210. For example, tester device 230 may display icons representing each customer device 210 connected to network 240. In this case, the icons may indicate whether customer device 210 is associated with a particular network operator (e.g., a circle icon) or with another network operator (e.g., a square icon). As shown by reference number 715, tester device 230 may display an indication identifying which customer device 210 is experiencing communication/operation errors (e.g., as shown by the dashed box).

In this way, tester device 230 may display information in a manner that permits quick and easy identification of customer devices 210 that are connected to network 240 and identification of a particular customer device 210 that is experiencing an error.

Figure 7B:
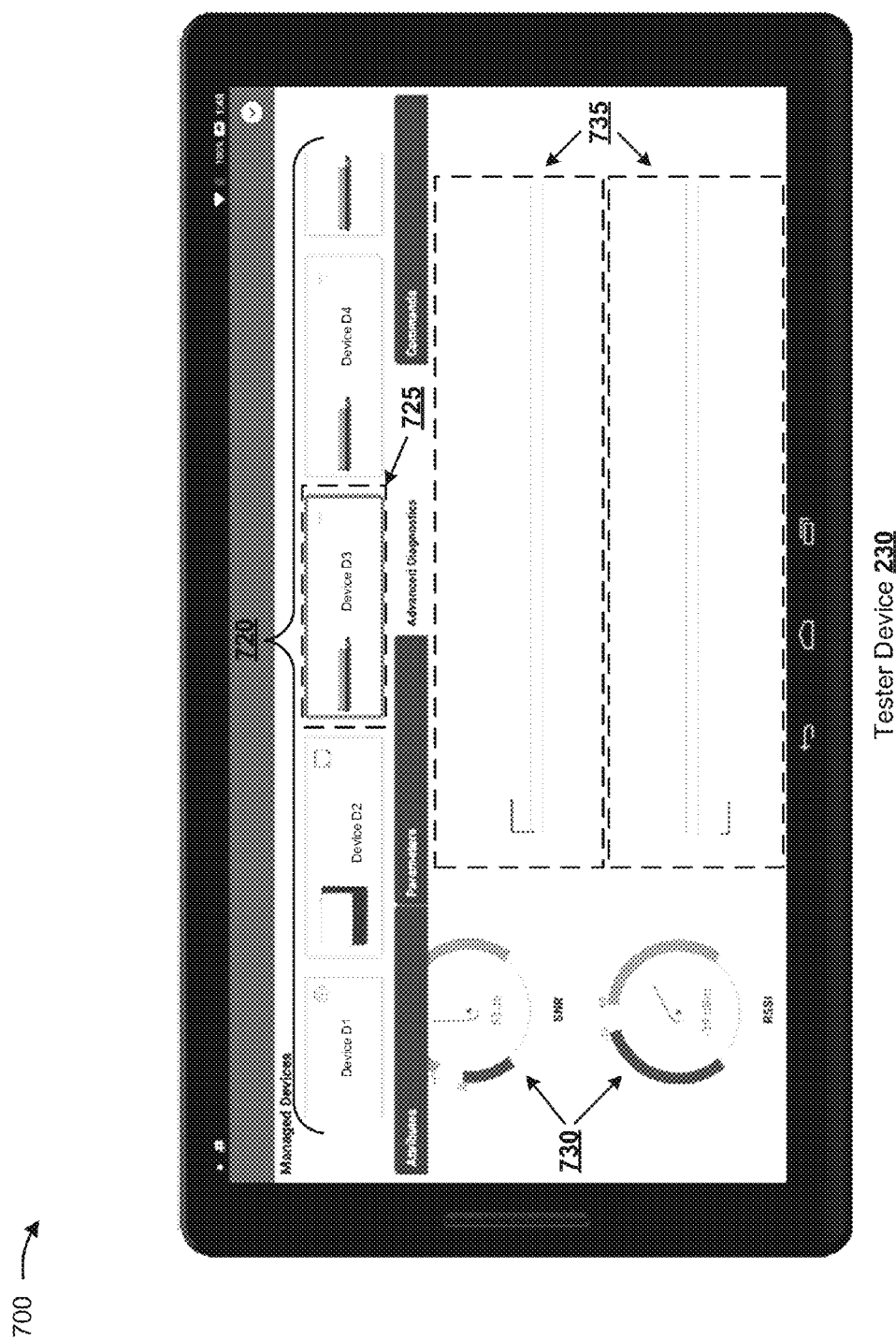

As shown in FIG. 7B, and by reference number 720, tester device 230 may display one or more icons, for each customer device 210 connected to network 240, such that user selection of an icon causes customer device 210-specific information to be displayed. For example, a user may select an icon for a particular customer device 210, such as by selecting the icon for device D3, as shown by reference number 725.

As shown by reference number 730, tester device 230 may display meter or gauge-type displays for various information, such as an SNR value and/or an RSSI value, for the selected customer device 210. In this case, tester device 230 may use the instruments to indicate a value and/or quality (e.g., high, medium, low) of the value of the information. As shown by reference number 735, tester device 230 may display a chart and/or a graph that displays values of the various information. In some implementations, the information may be displayed in real-time or near real-time.

In this way, tester device 230 may display information related to a particular customer device 210, thereby enabling quick and efficient determination of the information by a user of tester device 230.

Figure 7C:
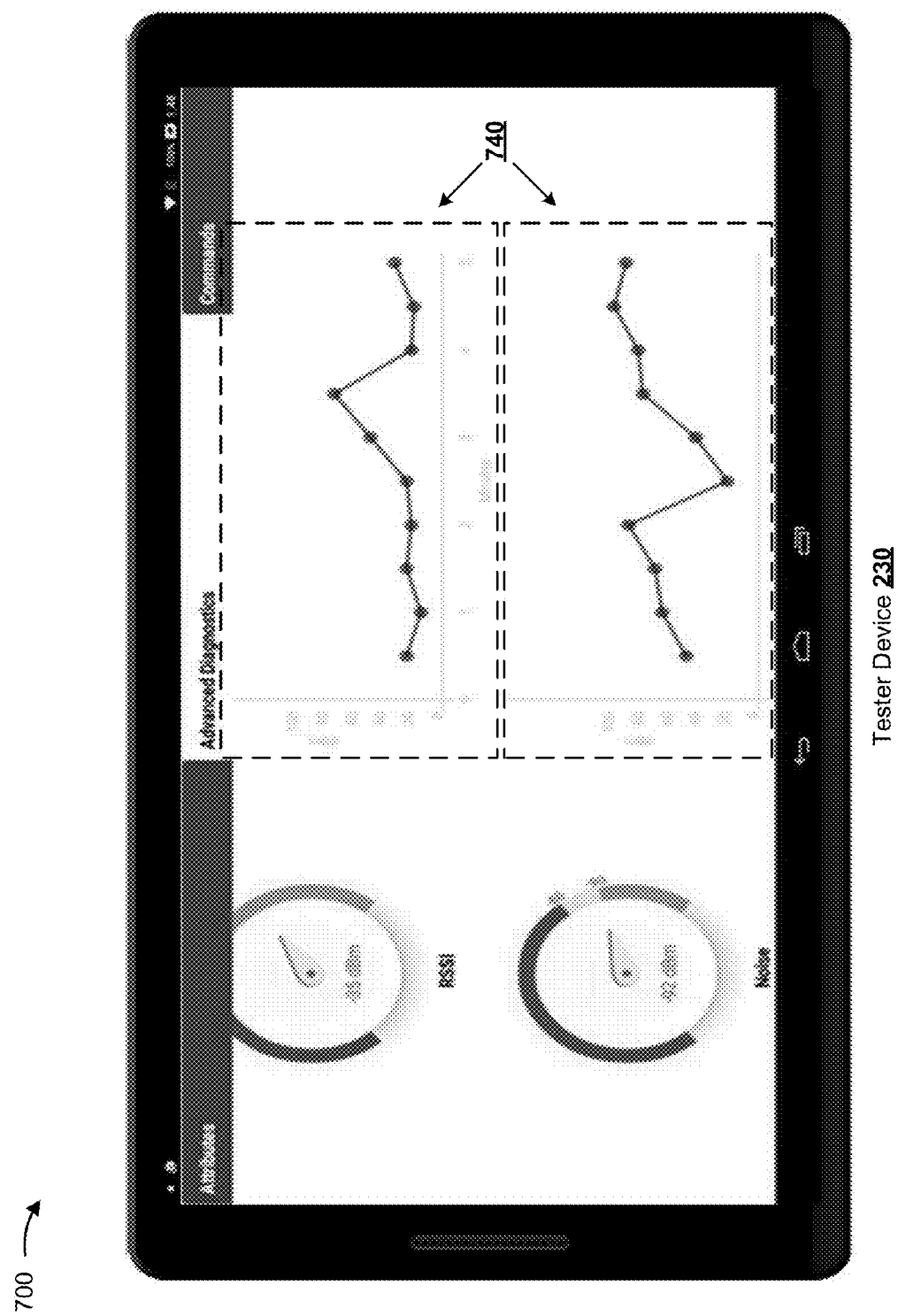

As shown in FIG. 7C, and by reference number 740, tester device 230 may display a chart and/or graph that displays historical values of information during a particular time period. For example, the chart and/or graph may display the value of an RSSI value or a noise value during the particular time period. In this way, tester device 230 may display additional information related to a particular customer device 210 (e.g., historical information), thereby enabling quick and efficient determination of the additional information by a user of tester device 230.

Figure 7D:
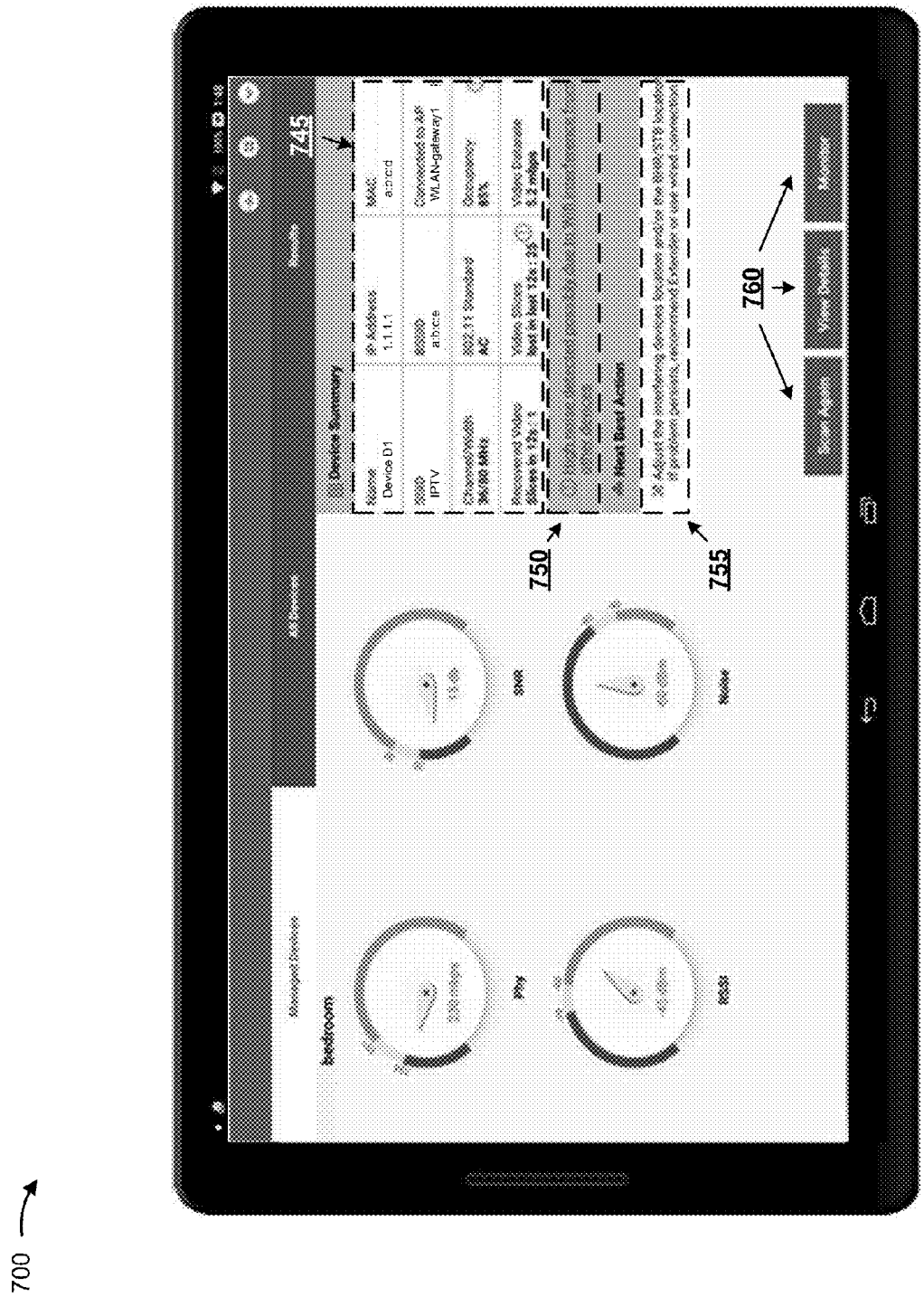

As shown in FIG. 7D, and by reference number 745, tester device 230 may display a summary of information related to a particular customer device 210. For example, tester device 230 may display information that identifies a name, or other identifier, of the particular customer device 210, an Internet protocol (IP) address of the particular customer device 210, a media access control (MAC) address of the particular customer device 210, an SSID of the particular customer device 210, information related to communications and/or operations of the particular customer device 210, and/or the like.

As shown by reference number 750, tester device 230 may display information identifying a source of a communication and/or an operation error, such as a threshold amount of noise due to wireless interference from peer customer devices 210. As shown by reference number 755, tester device 230 may display a generated recommendation to correct the error based on the identified source of the error, such a recommendation to adjust the location of the interfering customer devices 210 and to re-analyze the communications and/or operations of the particular customer device 210.

As shown by reference number 760, tester device 230 may provide various controls (e.g., buttons), selection of which may cause tester device 230 to perform various actions. For example, such actions may include re-collecting information for the device (e.g., "Scan Again"), providing additional information for display related to customer device 210 (e.g., "View Details"), and/or monitoring information related to customer device 210 (e.g., "Monitor"), such as by receiving real-time or near real-time updates to the information.

In this way, tester device 230 may generate and display information identifying a source of an error of a particular customer device 210 and a recommendation based on identifying the source of the error. This facilitates fixing of the error, thereby improving communications and/or operations of the particular customer device 210.

Figure 7E:
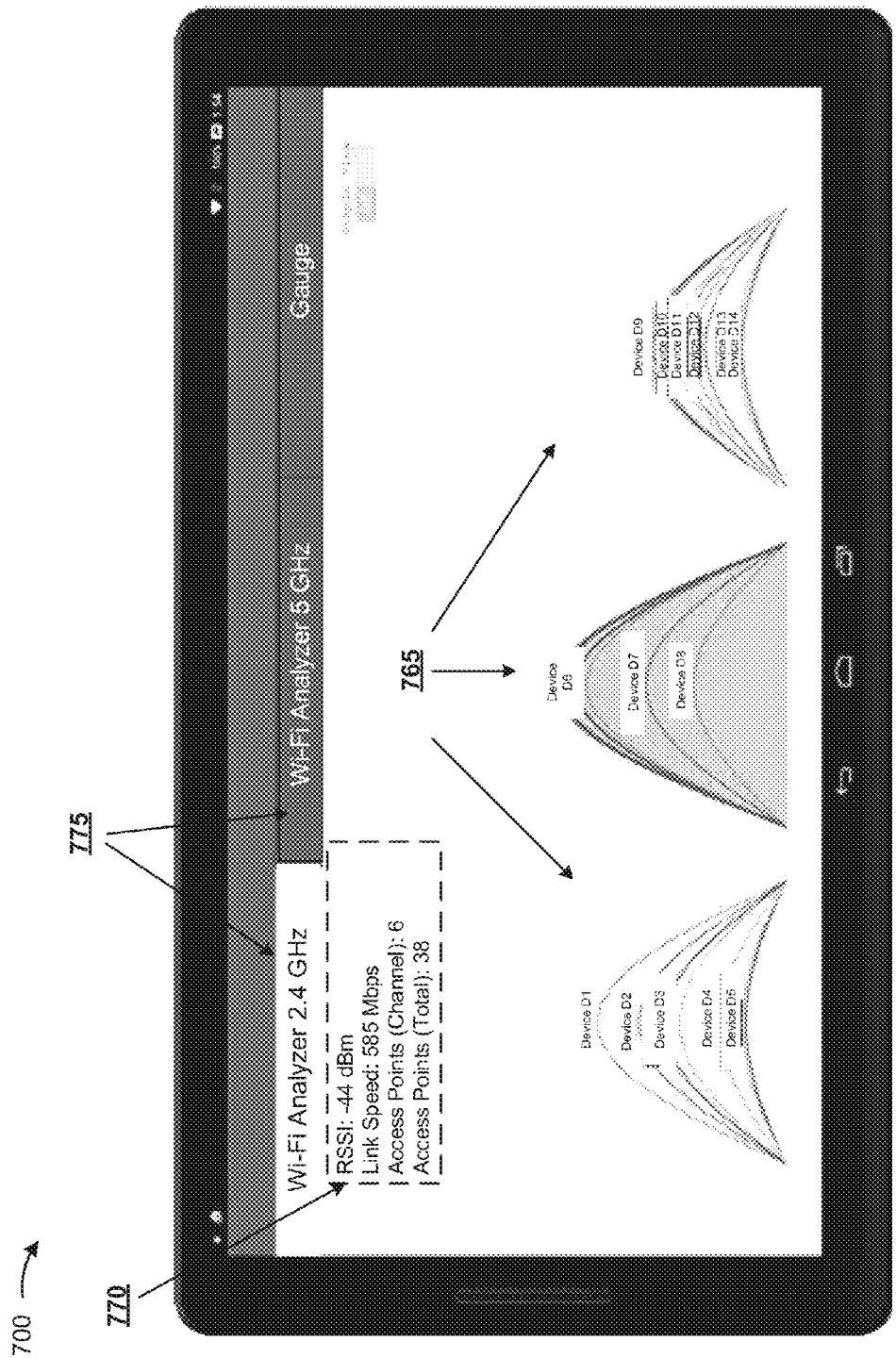

As shown in FIG. 7E, and by reference number 765, tester device 230 may display information related to various channels and customer devices 210 using the various channels. For example, tester device 230 may show the channels which customer devices 210 are using to communicate and the decibels per milliwatt (dBm) at which customer devices 210 are communicating. As shown by reference number 770, tester device 230 may display information related to a particular signal. For example, tester device 230 may display an RSSI value, a link speed value, and/or the like. As shown by reference number 775, tester device 230 may display one or more controls for toggling the displayed information between various frequency spectrums (e.g., a 2.4 GHz frequency spectrum or a 5 GHz frequency spectrum).

In some implementations, tester device 230 may perform an action based on the information displayed by tester device 230, such as to fix the error, as described elsewhere herein. Additionally, or alternatively, tester device 230 may perform an action based on user interaction with tester device 230. In this way, tester device 230 may improve communications and/or operations of customer device 210.

In this way, tester device 230 may determine and display information related to various channels used by customer devices 210, thereby enabling quick and easy determination of the information. In this way, tester device 230 may obtain a customer premises-wide view of wireless communications and/or operations of customer devices 210.

As indicated above, FIGS. 7A-7E are provided merely as an example. Other examples are possible and may differ from what was described with regard to FIGS. 7A-7E.

Implementations described herein provide a tester device which receives information, related to communications and/or operations of a customer device, directly from the customer device. The tester device may perform an analysis of the information to identify a source of an error related to the communications and/or operations of the device. The tester device may further perform an action related to a result of the analysis. In this way, the tester device increases an accuracy of identifying a source of an error. Furthermore, the tester device increases an efficiency and reduces an amount of time to identify a source of an error. Further still, the tester device reduces or eliminates the need for multiple external devices to identify a source of an error.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A tester device, comprising:
one or more processors to:
   establish a connection to multiple customer devices using a set of protocols to obtain a customer premises-wide view of wireless communications or operations of the multiple customer devices,
      the wireless communications being via a channel of a radio frequency,
      the set of protocols including:
         a Universal Plug and Play (UPnP) protocol, or
         an Open Mobile Alliance device management (OMA DM) protocol;
   receive, from the multiple customer devices, information related to the wireless communications or the operations of the multiple customer devices based on establishing the connection,
      the information being received via use of the set of protocols,
      the information being determined by the multiple customer devices rather than by the tester device or another device external to the multiple customer devices;
   perform an analysis of the information to determine whether metrics related to the wireless communications or the operations of the multiple customer devices satisfy corresponding thresholds based on receiving the information;
   provide a set of instructions to the multiple customer devices to cause the multiple customer devices to use a different channel to communicate based on determining whether the metrics related to the wireless communications or the operations of the multiple customer devices satisfy the corresponding thresholds;
   perform a throughput test, or another test, of the multiple customer devices based on providing the set of instructions to the multiple customer devices;
   receive additional information related to the wireless communications or the operations of the multiple customer devices from the multiple customer devices based on performing the throughput test;
   perform a comparison of the information and the additional information to determine whether the wireless communications or the operations of the multiple customer devices improved when using the different channel based on receiving the additional information; and
   provide another set of instructions to the multiple customer devices to cause the multiple customer devices to use the channel or the different channel based on determining whether the wireless communications or the operations of the multiple customer devices improved when using the different channel.

2. The tester device of claim 1, where the one or more processors are further to:
   identify a location to which to move a first customer device, of the multiple customer devices, to improve the wireless communications or the operations of the first customer device based on the information related to the wireless communications or the operations of a second customer device, of the multiple customer devices; and
   generate a recommendation to move the first customer device to the location based on identifying the location.

3. The tester device of claim 1, where the one or more processors, when performing the analysis, are to:
   perform multiple types of analyses using the information based on receiving the information,
      the multiple types of analyses including analyses of a received signal strength indicator (RSSI) value, a signal-to-noise ratio (SNR) value, a line attenuation value, or a signal quality value,
      the multiple types of analyses being performed in a particular order to identify a cause of the metrics not satisfying the corresponding thresholds; and
   where the one or more processors are further to:
      generate a recommendation related to the multiple customer devices based on performing the multiple types of analyses.

4. The tester device of claim 1, where the one or more processors, when establishing the connection, are to:
   establish the connection to the multiple customer devices via a local area network (LAN) and without establishing the connection via a wide area network (WAN),
      the LAN being associated with a customer premises at which the multiple customer devices are located; and
   where the one or more processors, when receiving the information, are to:
      receive the information via the LAN and without receiving the information via the WAN based on establishing the connection via the LAN and without establishing the connection via the WAN.

5. The tester device of claim 1, where the one or more processors are further to:
   determine that a particular metric, of the metrics, does not satisfy a corresponding threshold based on performing the analysis; and
   determine that a software update or a hardware update for the multiple customer devices can improve the wireless communications or the operations of the multiple customer devices based on determining that the particular metric does not satisfy the corresponding threshold.

6. The tester device of claim 1, where the one or more processors are further to:
   provide instructions to the multiple customer devices to cause the multiple customer devices to use a particular frequency spectrum to communicate based on receiving the information,
      the particular frequency spectrum being different than a frequency spectrum previously used by the multiple customer devices;
   receive other information from the multiple customer devices based on providing the instructions to the multiple customer devices;
   perform another comparison of the information and the other information based on receiving the other information; and
   where the one or more processors, when performing the analysis, are to:

perform the analysis based on performing the other comparison of the information and the other information.

7. The tester device of claim 1, where the one or more processors, when receiving the information, are to:
receive the information in real-time or near real-time using the UPnP protocol or the OMA DM protocol.

8. A non-transitory computer-readable medium storing instructions, the instructions comprising:
one or more instructions that, when executed by one or more processors, cause the one or more processors to:
establish a connection to multiple customer devices using a protocol to obtain a customer premises-wide view of wireless communications or operations of the multiple customer devices,
the wireless communications being via a channel of a radio frequency,
the protocol including a Universal Plug and Play (UPnP) protocol or an Open Mobile Alliance device management (OMA DM) protocol;
receive, from the multiple customer devices, information related to the wireless communications or the operations of the multiple customer devices based on establishing the connection,
the information having been recorded by the multiple customer devices during the wireless communications or the operations of the multiple customer devices rather than by a tester device or another device external to the multiple customer devices;
perform an analysis of the information to determine whether metrics related to the wireless communications or the operations of the multiple customer devices satisfy corresponding thresholds based on receiving the information;
provide a set of instructions to the multiple customer devices to cause the multiple customer devices to use a different channel to communicate based on determining whether the metrics related to the wireless communications or the operations of the multiple customer devices satisfy the corresponding thresholds;
perform a throughput test of the multiple customer devices based on providing the set of instructions to the multiple customer devices,
the throughput test testing the wireless communications or the operations of the multiple customer devices;
receive additional information related to the wireless communications or the operations of the multiple customer devices from the multiple customer devices based on performing the throughput test;
perform a comparison of the information and the additional information to determine whether the wireless communications or the operations of the multiple customer devices improved when using the different channel based on receiving the additional information; and
provide another set of instructions to the multiple customer devices to cause the multiple customer devices to use the channel or the different channel based on determining whether the wireless communications or the operations of the multiple customer devices improved when using the different channel.

9. The non-transitory computer-readable medium of claim 8, where the one or more instructions, that cause the one or more processors to perform the throughput test, cause the one or more processors to:
perform an upstream throughput test between a first customer device, of the multiple customer devices, and a second customer device, of the multiple customer devices, based on providing the set of instructions to the multiple customer devices;
perform a downstream throughput test between the first customer device and the second customer device based on providing the set of instructions to the multiple customer devices; and
determine a result of the upstream throughput test and the downstream throughput test based on performing the upstream throughput test and the downstream throughput test.

10. The non-transitory computer-readable medium of claim 9, where the one or more instructions, when executed by the one or more processors, further cause the one or more processors to:
identify the first customer device or the second customer device as a cause of the metrics not satisfying the corresponding thresholds based on determining the result of the upstream throughput test and the downstream throughput test; and
generate a recommendation to replace the first customer device or the second customer device to improve the wireless communications or the operations based on identifying the first customer device or the second customer device as the cause of the metrics not satisfying the corresponding thresholds.

11. The non-transitory computer-readable medium of claim 8, where the one or more instructions, when executed by the one or more processors, further cause the one or more processors to:
generate a recommendation to move a first customer device, of the multiple customer devices, to a particular location based on performing the analysis of the information,
the particular location being determined based on other information received from a second customer device, of the multiple customer devices;
receive an indication that the first customer device has been moved to the particular location based on generating the recommendation to move the first customer device to the particular location; and
perform another analysis of the additional information received from the first customer device based on receiving the indication that the first customer device has been moved to the particular location.

12. The non-transitory computer-readable medium of claim 8, where the one or more instructions, that cause the one or more processors to perform the analysis, cause the one or more processors to:
perform the analysis of the information by analyzing the metrics in a particular order and in a process-of-elimination manner to identify a cause of the metrics not satisfying the corresponding thresholds based on receiving the information.

13. The non-transitory computer-readable medium of claim 8, where the one or more instructions, when executed by the one or more processors, further cause the one or more processors to:
provide the information to a remote support device to permit the remote support device to provide a remote support service to the multiple customer devices.

14. The non-transitory computer-readable medium of claim 8, where the one or more instructions, when executed by the one or more processors, further cause the one or more processors to:

provide instructions to the multiple customer devices to cause the multiple customer devices to change frequencies used to communicate based on determining whether the metrics satisfy the corresponding thresholds;

perform another throughput test of the multiple customer devices after the multiple customer devices have changed frequencies based on providing the instructions to the multiple customer devices; and determine whether the wireless communications or the operations of the multiple customer devices improved based on performing the other throughput test.

15. A method, comprising:

establishing, by a tester device, a connection to multiple customer devices using a protocol to obtain a customer premises-wide view of wireless communications or operations of the multiple customer devices,
   the protocol including a Universal Plug and Play (UPnP) protocol or an Open Mobile Alliance device management (OMA DM) protocol,
   the protocol permitting direct communication between the tester device and the multiple customer devices,
   the multiple customer devices communicating via a channel of a radio frequency;

receiving, by the tester device, information related to the wireless communications or the operations of the multiple customer devices based on establishing the connection,
   the information being received from the multiple customer devices via use of the protocol,
   the information having been determined by the multiple customer devices rather than by the tester device or another device external to the multiple customer devices;

performing, by the tester device, an analysis of the information to determine whether metrics related to the wireless communications or the operations of the multiple customer devices satisfy corresponding thresholds based on receiving the information;

providing, by the tester device, a set of instructions to the multiple customer devices to cause the multiple customer devices to use a different channel to communicate based on determining whether the metrics related to the wireless communications or the operations of the multiple customer devices satisfy the corresponding thresholds;

performing, by the tester device, a throughput test, or another test, of the multiple customer devices based on providing the set of instructions to the multiple customer devices;

receiving, by the tester device, additional information related to the wireless communications or the operations of the multiple customer devices from the multiple customer devices based on performing the throughput test;

performing, by the tester device, a comparison of the information and the additional information to determine whether the wireless communications or the operations of the multiple customer devices improved when using the different channel based on receiving the additional information; and providing, by the tester device, another set of instructions to the multiple customer devices to cause the multiple customer devices to use the channel or the different channel based on determining whether the wireless communications or the operations of the multiple customer devices improved when using the different channel.

16. The method of claim 15, where performing the throughput test comprises:

performing parallel throughput tests of the multiple customer devices or serial throughput tests of the multiple customer devices based on establishing the connection to the multiple customer devices; and where receiving the additional information comprises:
   receiving the additional information based on performing the parallel throughput tests or the serial throughput tests.

17. The method of claim 15, further comprising:

identifying a cause of the metrics not satisfying the corresponding thresholds based on performing the analysis of the information; and obtaining software for the multiple customer devices to improve the wireless communications or the operations of the multiple customer devices based on identifying the cause of the metrics not satisfying the corresponding thresholds,
   the software being related to the wireless communications or the operations of the multiple customer devices, or providing instructions to the multiple customer devices to cause the multiple customer devices to obtain the software.

18. The method of claim 15, further comprising:

generating a recommendation to use an extender based on performing the analysis of the information;

receiving an indication that the extender is being used based on generating the recommendation to use the extender; and where performing the throughput test comprises:
   performing the throughput test based on receiving the indication that the extender is being used.

19. The method of claim 15, further comprising:

storing a result of the analysis based on performing the analysis; and using the result of the analysis to perform another analysis of multiple other customer devices.

20. The method of claim 15, where performing the comparison comprises:

performing a first comparison of first information and a first threshold to identify a cause of the metrics not satisfying the corresponding thresholds based on receiving the first information;

performing a second comparison of second information and a second threshold to identify the cause of the metrics not satisfying the corresponding thresholds based on receiving the second information;

determining a result of the first comparison and the second comparison based on performing the first comparison and the second comparison; and identifying the cause of the metrics not satisfying the corresponding thresholds based on determining the result of the first comparison and the second comparison.

* * * * *